United States Patent
Drillman et al.

(10) Patent No.: US 12,315,206 B2
(45) Date of Patent: May 27, 2025

(54) INSPECTION SYSTEM FOR EDGE AND BEVEL INSPECTION OF SEMICONDUCTOR STRUCTURES

(71) Applicant: CAMTEK LTD, Migdal Ha'emek (IL)

(72) Inventors: Carmel Yehuda Drillman, Haifa (IL); Mordi Dahan, Kiryat Bialik (IL); Moshe Edri, Kiryat Tivon (IL); Ohad Shimon, Ramat Yishai (IL); Shimon Koren, Haifa (IL); Gil Perlberg, Zichron Yaakov (IL)

(73) Assignee: CAMTEK LTD, Migdal Ha'emek (IL)

( * ) Notice: Subject to any disclaimer, the term of this patent is extended or adjusted under 35 U.S.C. 154(b) by 0 days.

(21) Appl. No.: 18/644,312

(22) Filed: Apr. 24, 2024

(65) Prior Publication Data

US 2024/0355083 A1     Oct. 24, 2024

Related U.S. Application Data

(60) Provisional application No. 63/497,859, filed on Apr. 24, 2023, provisional application No. 63/510,221, filed on Jun. 26, 2023.

(51) Int. Cl.
*G06V 10/145*     (2022.01)
*G01N 21/95*     (2006.01)
(Continued)

(52) U.S. Cl.
CPC ....... *G06V 10/145* (2022.01); *G01N 21/9503* (2013.01); *G06T 7/0004* (2013.01);
(Continued)

(58) Field of Classification Search
None
See application file for complete search history.

(56) References Cited

U.S. PATENT DOCUMENTS 1,943,510 A    1/1934 Walter et al.
6,633,375 B1    10/2003 Veith et al.
(Continued)

FOREIGN PATENT DOCUMENTS

DE    102008041135 A1    2/2010
EP        4033226 A1    7/2022
(Continued)

OTHER PUBLICATIONS

International Search Report PCT/IL2023/050661 filed Jun. 27, 2023; Report dated Sep. 13, 2023.
(Continued)

*Primary Examiner* — Christopher Braniff
(74) *Attorney, Agent, or Firm* — CANTOR COLBURN LLP

(57) ABSTRACT

An inspection system and method are presented for edge and bevel inspection of a semiconductor structure using and an optical system defining: a tangential imaging providing back-light tangential illumination propagating along a tangential illumination path with respect to a contour outline of a contour region of an edge of the structure and substantially along a detection path of a tangential imaging sensor unit which detects at least a part of said back-light tangential illumination and generates image data indicative of a tangential image of the contour outline to enable detection of defect data of the edge, and at least dark-field imaging setup directing dark-field illumination towards the contour region along at least one dark-field illumination path and providing collection of scattering of a response of the contour region to the dark-field illumination, to enable detection of a dark-field image indicative of location of defects along said profile of the edge.

19 Claims, 18 Drawing Sheets

(51) Int. Cl.
*G06T 7/00* (2017.01)
*G06T 7/13* (2017.01)
*H04N 23/56* (2023.01)

(52) U.S. Cl.
CPC ............... *G06T 7/13* (2017.01); *H04N 23/56* (2023.01); *G06T 2207/10152* (2013.01); *G06T 2207/30148* (2013.01)

(56) References Cited

U.S. PATENT DOCUMENTS

| | | |
|---|---|---|
| 7,059,778 B2 | 6/2006 | Suzuki et al. |
| 7,508,204 B2 | 3/2009 | Haider et al. |
| 7,773,212 B1 | 8/2010 | Wolters et al. |
| 9,734,568 B2 | 8/2017 | Vajaria et al. |
| 10,008,424 B2 | 6/2018 | Wimplinger |
| 11,828,713 B1 | 11/2023 | Drillman et al. |
| 11,927,545 B1 | 3/2024 | Drillman et al. |
| 2004/0056216 A1 | 3/2004 | Inenaga et al. |
| 2008/0212084 A1 | 9/2008 | Watkins et al. |
| 2009/0161094 A1 | 6/2009 | Watkins |
| 2009/0195866 A1 | 8/2009 | Kawaski et al. |
| 2009/0196489 A1 | 8/2009 | Le |
| 2010/0134615 A1 | 6/2010 | Akamatsu et al. |
| 2010/0246934 A1 | 9/2010 | Hayashi et al. |
| 2011/0064297 A1 | 3/2011 | Sakaguchi et al. |
| 2013/0120557 A1 | 5/2013 | King et al. |
| 2013/0215258 A1 | 8/2013 | Gaglin et al. |
| 2014/0253910 A1 | 9/2014 | Lewis |
| 2015/0355106 A1 | 12/2015 | Horn |
| 2015/0370175 A1* | 12/2015 | Nicolaides ............ G03F 7/7085 355/77 |
| 2017/0140524 A1 | 5/2017 | Karsenti et al. |
| 2017/0329122 A1 | 11/2017 | Osawa |
| 2019/0250108 A1 | 8/2019 | Sachs et al. |

FOREIGN PATENT DOCUMENTS

| | | |
|---|---|---|
| IL | 243167 B | 2/2021 |
| JP | 2000046743 A | 2/2000 |
| JP | 2009025003 A | 2/2009 |
| JP | 2011022504 A1 | 2/2011 |
| KR | 20100053038 A | 5/2010 |
| WO | 10015696 A1 | 8/2024 |

OTHER PUBLICATIONS

International Search Report for corresponding application PCT/IL2024/050387: Mail date Jul. 31, 2024.

* cited by examiner

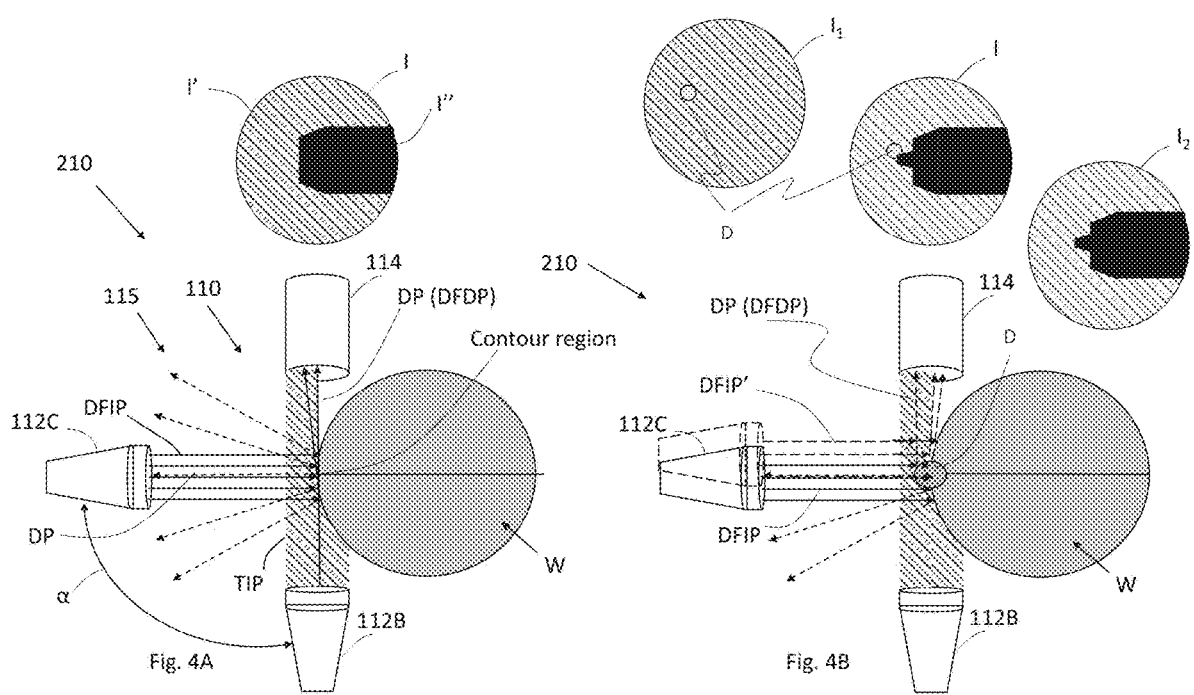

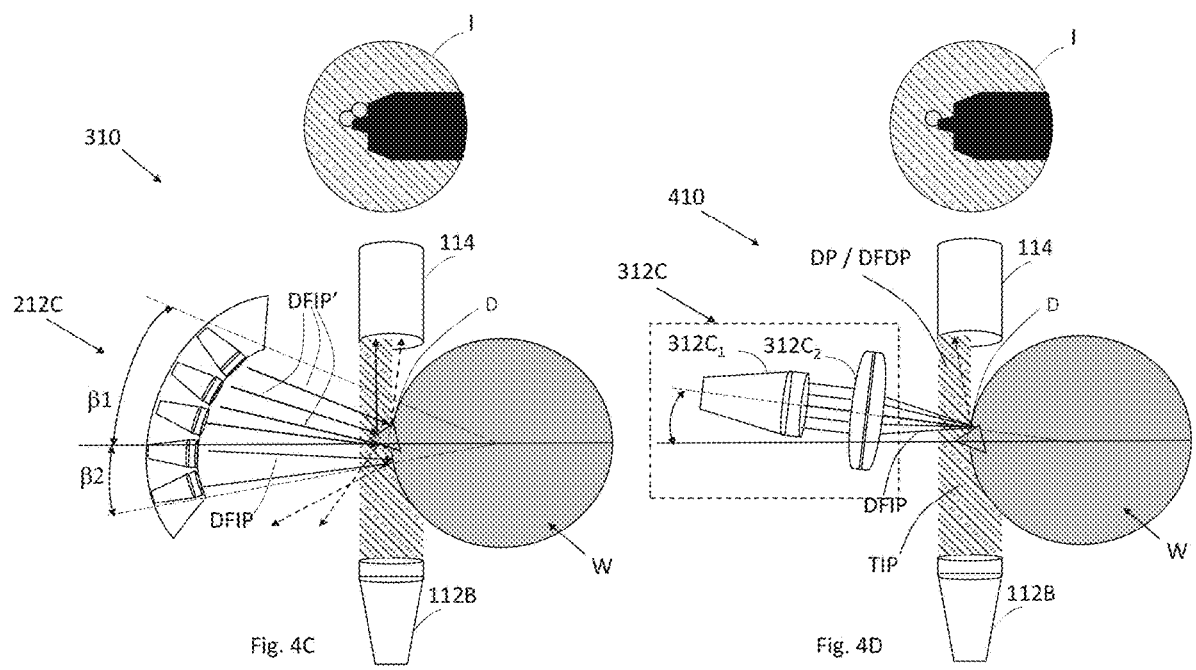

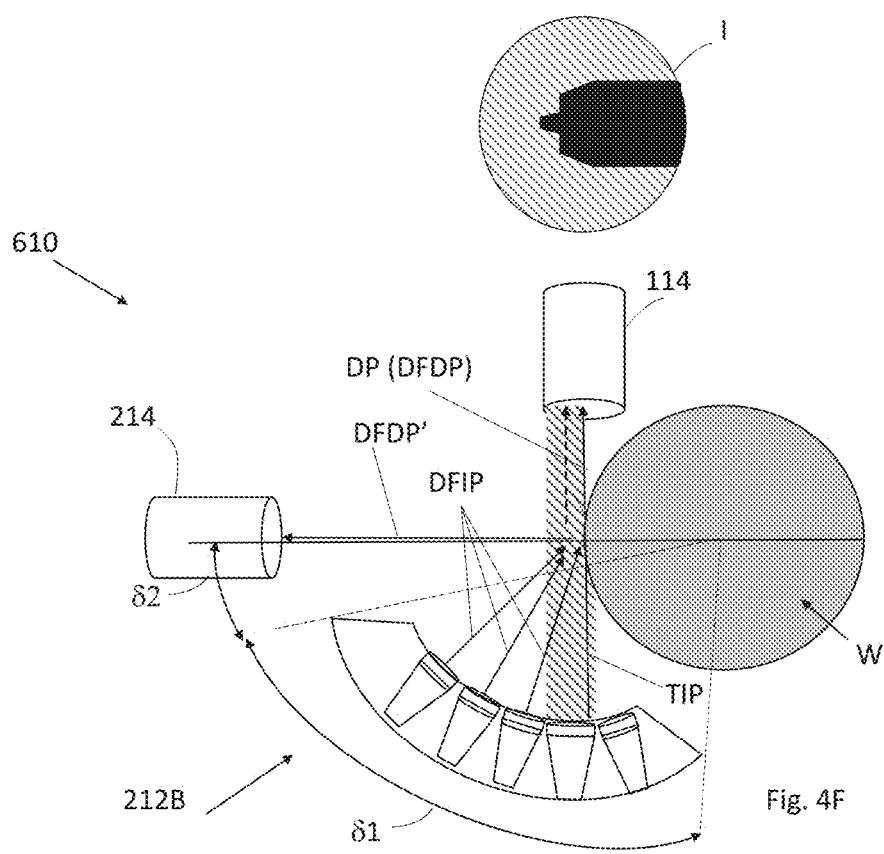

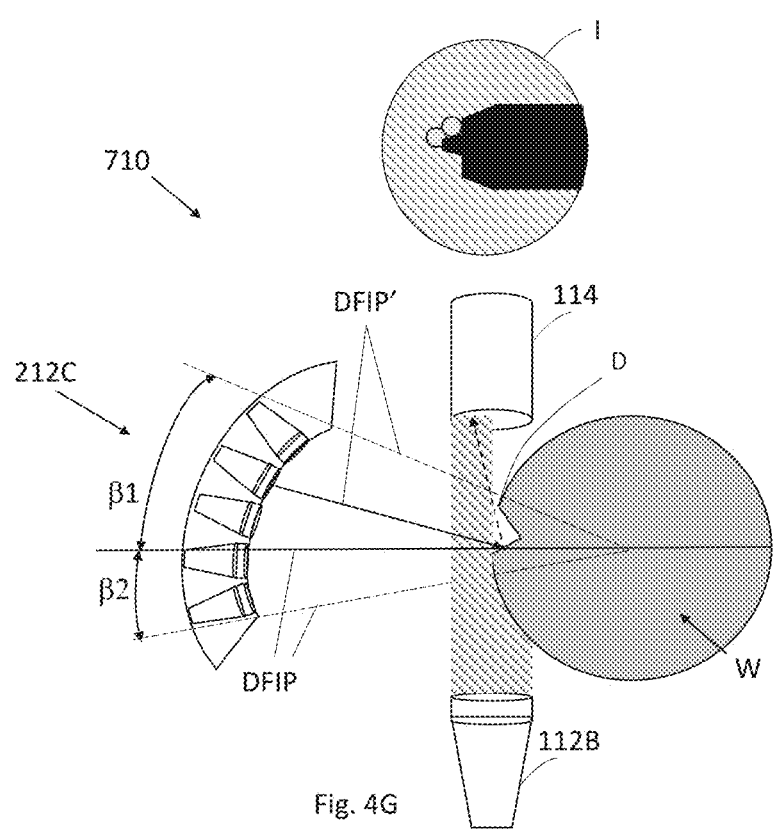

INSPECTION SYSTEM FOR EDGE AND BEVEL INSPECTION OF SEMICONDUCTOR STRUCTURES

TECHNOLOGICAL FIELD

The present disclosure is generally in the field of automatic inspection of semiconductor structures ("wafers") that can be used for the control of the structure manufacturing process. More specifically, the present disclosure relates to edge and bevel inspection of a semiconductor structure.

BACKGROUND

Inspection of the Edge & Bevel (E&B) is a common process step in wafer manufacturing. E&B inspection includes the wafer edge surface, that is, the outwards radially facing edge, as well as the rims of the top and bottom wafer (product) surfaces, also referred to as bevels. The E&B inspection is often faster and cheaper than top and or bottom side inspection and is sometimes conducted prior to other types of inspection.

The E&B inspection provides insights with respect to the wafer/product state, as well as to the manufacturing process. In manufacturing, it can provide data being indicative of process stability. It can also be used in process development phases, after each stage of the manufacturing processes is being developed.

In some cases, data obtained in the inspection of the E&B is used to decide if to continue the inspection process and/or the manufacturing process. In some cases, data obtained in the inspection of the E&B can be integrated with top or bottom side inspection results to present a more complete picture of the wafer condition.

The development of multi-stack packages has increased the need for E&B inspection. In some cases, an inspection of the wafer edge provides insights as to the internal aspects of the multi-stack package, insights that cannot easily be obtained by other inspection means.

A typical stack configuration includes multiple layers with connection material in between. In some cases, the connection material is glue, a resin, or material that holds the stack layers physically connected. A typical stack configuration has more than one edge and more than one bevel, or more than one pair, of bevels.

General Description

In an Edge and Bevel (E&B) inspection process, an image sensor collects most of the light returned from edge and bevel zones/regions of a semiconductor structure being illuminated, and corresponding image data is analyzed to perform precise segmentation of the regions of interest (ROI) to determine the exact geometrical dimensions of the semiconductor structure, defect (abnormality) identification, as well as location and classification of the abnormalities.

There is a need in the art for a novel approach of edge and bevel inspection technique, enabling extraction of quantitative and qualitative information about the edge and bevel zones. In this connection, reference is made to FIG. 1A showing a schematic cross-sectional view of an edge portion EP of a wafer (constituting a semiconductor structure, as will be described more specifically further below).

The edge portion EP has different zones Zone 1, . . . . Zone 5 which define the edge and bevel surfaces of the wafer. The top side of the wafer includes a top flat surface portion (central area of the wafer), which is typically subjected to a separate inspection technique referred in the figure as "surface inspection", which is not a part of this disclosure. Periphery zones of the top flat surface and bottom flat surface define, respectively. Zone 1 and Zone 5 of the edge portion EP. Interface regions IR characterize transition between these Zones 1 and 5 and the respective central top and bottom flat surfaces. At the opposite sides, Zone 1 and Zone 5 interface with Zone 2 and Zone 4 defining, respectively, top bevel zone and bottom bevel zone of the rounded edge; and Zone 3 is the apex of the rounded edge.

In general, it is challenging to determine the location at which the various edge and bevel zones/regions start and end. For example, the locations where the top bevel (Zone 2) and the bottom bevel (Zone 4) start and interface with the respective top flat (Zone 1) and bottom flat (Zone 5) actually present transition regions TR.

Images obtained by using a conventional approach for edge and bevel inspection suffer from blurry appearance of the zones and transition regions in the acquired images. This is because the conventional approach is based on imaging using front-side illumination and bright-field imaging mode. Using this approach, the acquired image of the interface/transition regions between the adjacent zones of the edge portion (in particular images of the interface IR and transition regions TR) suffers from too low contrast (and is thus unclear). Moreover, a portion of some defects on the edge portion (on or near the edge and bevel regions) cannot be detected. Thus, some features/characteristics and conditions of the edge portion cannot be properly inspected or measured.

The technique of the present disclosure provides high-quality inspection of the edge portion of a semiconductor structure (e.g., wafer) including high-contrast imaging of the contour outline of each contour region being imaged, as well as that of the interfaces and transition regions, and provides for imaging of abnormalities within the contour region(s). This enables proper inspection of the profile of edge portion (defined by the above Zones 1-5 of the edge portion), and to detect, locate and classify various abnormalities along the profile.

The term "contour region" hereinafter defines a two-dimensional area/region being adjacent to and bounded by a contour outline. The term "contour outline" hereinafter signifies a curve (a line or a series of lines) that defines the boundary of the contour region of the edge portion of the semiconductor structure (that can be identified from a specific viewing angle).

The inspection technique of the present disclosure enables to accurately define the contour outline, as well as the interfaces IR (boundary between the top/bottom wafer plane $P_1/P_2$ and Zone 1/Zone 5), and the top/bottom transition regions TR. As described above, the transition region TR separates the flat zone and the bevel zone.

The inspection technique of the present disclosure, utilizing the tangential imaging setup(s) also enables determination of the tangent of a bevel ("bevel angle") for each tier in the semiconductor structure. The tangent of the bevel is typically of angle less than 0.1, 0.5, 1.0, 1.5, 2.0 degrees.

For the purposes of the present disclosure, a semiconductor structure is a structure, which forms one or more integrated circuit based electronic devices, or a structure which is a part of an integrated circuit based electronic device, or a structure in between (connecting) stacked integrated circuit based electronic devices.

The semiconductor structure being inspected by the technique of the present disclosure may thus be a single-tier or a multi-tier structure. Here, a tier (which may be of a singleor multi-layer configuration) has an edge portion configured as described above with reference to FIG. 1A, i.e., having the following zones: a top near-edge zone (at times referred to herein as a "top flat" zone) interfacing with the central top flat surface, a top bevel zone having a top transition region with the top near-edge zone, a bottom near-edge zone (at times referred to herein as "bottom flat" zone), a bottom bevel zone having a bottom transition region with the bottom near-edge zone, and an apex zone in between the top bevel zone and bottom bevel zone.

It should thus be understood that FIG. 1A shows a non-limiting example of a single-tier wafer (constituting a single-tier semiconductor structure). The term "tier" as used in the present disclosure should thus be interpreted broadly covering a wafer (of a single- or multi-layer configuration), a bonding layer, a resin layer, a coating or the like. In the multi-tier configuration of the semiconductor structure, the edge portion of the structure is defined by edge portions of the tiers forming such structure.

It should be noted that the term tier should not be confused with the term "layer" in the meaning of multi-layered integrated circuit device, such as a wafer, because in such a wafer structure, the variation of the edge profile affected by various abnormalities within the edge portion is significantly below the layer resolution (i.e., the edge profile variation is significantly larger than the typical layers' thicknesses in the multi-layered integrated circuit device).

In the description below, the terms "multi-tier structure" and "multi-tier stack" are used interchangeably and refer to any possible configuration of a stack including more than one tier (e.g. three, four or five tiers) where, as described above, the tier may be of a single- or multi-layer configuration. The multi-tier stack may include a bonding tier made of a bonding material (e.g. resin) between two tiers.

Each tier, as well as a multi-tier structure, may have a thickness of a microscale, and does not have any limited thickness and may for example have a thickness of less than 10, 100, 500, 1,000, 5,000 or 10,000 microns.

The multi-tier stack does not have any limited thickness. For example a multi-tier stack might be of a thickness less than 10, 100, 500, 1,000, 5,000 or 10,000 microns. The term "thickness" is at times used interchangeably with the term "height" as measured from a side view, e.g., with optical means.

A typical multi-tier stack configuration has an edge portion defined by more than one edge and more than one bevel, or more than one pair of bevels. The edges and bevels of the multi-tier stack define a bonding interface volume which is defined by an interstitial space between every two tiers of the stack, and an external region between the bevels of each two tiers of the stack and may thus include multiple bevels.

It should also be noted that the comments and examples described herein as applied to bonding interface also apply to a wafer notch. The term "wafer notch" refers hereinafter to an indentation or incision on an edge or surface of the wafer that indicates the wafer's rotational orientation (i.e. being a wafer identifier).

The notch depth may be less than 0.5, 0.75, 1.0, 1.5, 2.0, 3.0, 5.0 or 10 mm.

In the description below; the terms "wafer" and "semiconductor structure" are used interchangeably, since a semiconductor structure may be configured as a single-tier layered structure of integrated circuits on a single wafer, or a multi-tier stack of layered structures of wafers carrying integrated circuits, including bonding layers, coating etc., as mentioned above.

The term "wafer" refers hereinafter to any substrate (i.e. base material) made of silicon, glass, or any other semiconductor material such as silicon carbide, gallium nitride, germanium, gallium arsenide, silver (Ag), gold (Au), aluminum (Al), copper (Cu), tantalum (Ta), tin (Sn), tungsten (W), palladium (Pd), aluminum nitride, aluminum phosphide, aluminum antimonide, and aluminum arsenide. In some embodiments, the wafer is made or coated with "mold compounds' or encapsulant material". Polymeric-based materials may be used to provide mechanical and environmental protection of a semiconductor structure. The wafer, when viewed from above, can be round, elliptical, square, hectogon, or may have any other geometrical shape. The substrate edge can be trimmed, polished, or treated in any other manner. The wafer's top surface may include one or more patterned layers or may be bare. The wafer may further include at least a portion of an integrated circuit, a thin-film head die, a micro-electro-mechanical system (MEMS) device, flat panel displays, magnetic heads, magnetic and optical storage media, other components that may include photonics and optoelectronic devices such as lasers, waveguides and other passive components processed on wafers, print heads, and bio-chip devices processed on wafers. The wafer does not have any limited thickness.

For example, the wafer has a thickness of less than 10, 50, 100, 500, 600, 750, 1000, 1500, 3000, 5000, or 10000 microns.

Also, in the description below; imaging technique is described as being applied to various contour regions of the edge portion of a segment or slice of the semiconductor structure, as well as edge portions of successive segments/slices of structure during the rotation of the structure. The term "segment" or "slice" refers hereinafter to a wedge-shaped portion of the structure. Seen from above, it is a triangular (or triangular-like) portion of the structure's surface, when the tip of the triangle is at the center of the structure and the base of the triangle (the other two corners of the triangle) are on the perimeter (circumference) of the structure.

The segment/slice may define an angle less than 1, 2, 3 5, 10, 15, 20 degrees.

It should be noted that the coordinates (in the structure's plane) of the segments/slices defining the contour regions being imaged (covered by the fields of view) of the imaging setups are typically known thus allowing for proper registering different image data pieces provided by different imaging setups during the structure's inspection (e.g., during rotation of the structure).

The term "inspection" used herein should be interpreted broadly covering defect detection (identification of defect data) and also metrology aspect of the wafer/semiconductor structure examination. The wafer inspection technique of the present disclosure can be used for the control of the wafer manufacturing process; and can be used as a part of/concurrently with automatic inspection of integrated circuits incorporated in the wafer structure, e.g., during the wafer manufacture while progressing on a production line.

The term "defect data" refers hereinafter to any information referring to any anomaly/abnormality and variations along the edge of a semiconductor structure including but not limited to particles (e.g. resist particles, embedded particles), debris, material splash, chips, stains, edge cracks, scratches, copper-overflow, delamination, blisters, corrosion, surface roughness, discoloration, chipping edge and through the tape, bubbles, vacancies, resin flash or any combination thereof. The information relating to the defect data can include the dimensions (e.g. shape), the location and the properties of the defect. The defect may be external to the edge portion of the semiconductor structure and may protrude from the contour outline (e.g. excess glue or material (e.g. coating) residues), or may be internal to the edge portion of the semiconductor structure. For example, the external defect data may be indicative of a string-shaped oddment, whose length is significantly longer than its width or lateral dimension (diameter), or of a flap-like shaped oddment whose length or thickness dimensions, extending from the edge portion, is significantly smaller than its width. In an embodiment, the external defect's major dimension is its length along the structure perimeter (circumference). In some embodiments, the external defect's major dimension is its length protruding out of the tier perimeter (circumference).

For example, the defect's major dimension may be less than 1, 5, 10, 25, 50, 100, 200, 500, 750, 1000 microns.

The defect data, as viewed from the side or top, or bottom of the semiconductor structure, can be indicative of defects being internal to the edge portion, such as voids, cracks, alignment or discoloration on the surface of the structure (e.g., mold part of the structure).

There is a need for inspection and/or metrology of a stack contour outline, external defects, bevel(s) profile, bonding interface between top and bottom surfaces, or bonding material outer aspects. Moreover, there is a need in the art to provide a simultaneous inspection of the E&B of multiple layers in a multi-tier stack. Furthermore, there is a need in the art to provide additional information, from additional/different dimensions, to obtain a higher quality/resolution model of the edge and bevel region, as part of the E&B inspection process.

According to one broad aspect of the present disclosure, it provides an inspection system for edge and bevel inspection of a semiconductor structure, the inspection system comprising an optical system comprising a plurality of illumination and imaging sensor units configured and operable to define two or more imaging setups for performing imaging sessions of different types on one or more contour regions of an edge of the semiconductor structure and providing image data indicative of defect data of the edge of the semiconductor structure, said two or more imaging setups comprising:

a tangential imaging setup configured and operable to provide a tangential image of a contour outline of a contour region within an edge portion of said edge of the structure thereby enabling detection of the defect data of said edge portion; and at least one of the following imaging setups;

a dark-field imaging setup configured and operable to provide a dark-field image of a contour region indicative of location of defects along an edge portion;

an apex imaging setup configured and operable to provide image data indicative of an image of an apex contour region of an edge portion indicative of a layout of top-bevel zone, apex zone and bottom-bevel zone of the edge portion and of a bonding interface volume of the edge portion of the semiconductor structure;

an edge top plane imaging setup configured and operable to generate an image of a contour region of an edge portion edge of the semiconductor structure indicative of a layout of top near-edge zone, top bevel zone and apex zone of the edge portion of the semiconductor structure; and an edge bottom plane imaging setup configured and operable to generate an image of a contour region of an edge portion of the semiconductor structure indicative of a layout of bottom near-edge zone, bottom bevel zone and apex zone of the edge portion of the semiconductor structure.

According to another broad aspect of the present disclosure, there is provided an inspection system for edge and bevel inspection of a semiconductor structure. The inspection system comprises an optical system configured to define a tangential imaging setup and a dark-field imaging setup. The tangential imaging setup is configured and operable for providing image data indicative of a tangential image of a contour outline bounding a contour region of an edge portion of the semiconductor structure, to enable detection of defects data of a profile of the edge of the semiconductor structure. The tangential imaging setup comprises a tangential illumination unit and a tangential imaging sensor unit (e.g. camera(s)). The tangential illumination unit is configured and operable to provide back-light tangential illumination propagating along a tangential illumination path with respect to the contour outline of a contour region and substantially along a detection path of the tangential imaging sensor unit, which is configured and operable for collecting at least a part of said back-light tangential illumination propagating along said tangential illumination path and generating the tangential image of the contour outline. The dark-field imaging setup comprises a dark-field illumination unit configured for directing dark-field illumination towards said contour region along at least one dark-field illumination path being inclined with respect to said tangential illumination path, the dark-field imaging setup providing collection of scattering of a response of the contour region to the dark-field illumination, thereby enabling detection of a dark-field image indicative of location of defects along said profile of the edge of the semiconductor structure.

It should be understood that the tangential imaging setup is configured such that the tangential illumination path and the detection path of the tangential imaging sensor unit are substantially parallel and at least partially overlapping (e.g., substantially coinciding). This can be achieved by positioning the tangential imaging sensor unit such that the optical axis thereof is positioned in a tangential direction with respect to the contour outline.

The term "tangential direction" at times used hereinbelow refers to a direction/line (similar to a tangential line) intersecting the outer surface (perimeter/circumference) of the edge portion of the structure in one point but does not intersect the outer surface or edge portion anywhere else. The tangential direction vector is substantially perpendicular to the axis of rotation of the semiconductor structure.

It should also be understood that the response of the contour region to the incident dark-field illumination may be formed by light components of the dark-field illumination itself being scattered from the defects (so-called "primary response") and/or may include so-called "secondary response" being light emitted by defects in response to dark-field illumination (i.e., fluorescent response), as the case may be. In the description below, the response of the contour region to the incident dark-field illumination is termed as "scattering of the dark field illumination". However, as described above, this should be interpreted broadly covering also secondary emission in response to interaction with the dark-field illumination.

Considering detection of the primary response, the optical system is configured such that the dark field detection path is oriented substantially outside of direction of propagation of specular reflection of the dark-field illumination. Considering detection of the secondary response, orientation/position of the dark-field detection path is more flexible, since secondary emission such as fluorescence is typically less directional and propagates in various directions.

The semiconductor structure may be configured as a single-tier structure or a multi-tier structure defining the profile of the edge.

The term "edge" or "bevels" refers hereinafter to the non-flat part of the tiers. The term edge also applies to the resin or bonding material distal aspects.

The dark field illumination unit defines the dark-field illumination path appropriately oriented with respect to the contour region and with respect to the sensor unit to enable the sensor unit to collect scattering of the dark-field illumination from the contour region, while, in some embodiments, avoid or at least significantly reduce detection, by said sensor unit of reflection (specular reflection) of said dark-field illumination from the contour region.

Considering the use of the tangential sensor unit for detection of the scattering of the dark-field illumination, the dark-field illumination path may for example be oriented substantially perpendicular to the detection path of the tangential imaging sensor unit. Generally, however, the dark field illumination path(s) may be of any suitable angular orientation with respect to the detection path of the tangential imaging sensor unit.

For example, the dark field illumination path is oriented peripherally to the contour region, in the same plane as the semiconductor structure, and the detection path of the tangential imaging sensor unit and the illumination path of the dark field illumination are oriented at an angle in the range of about 0° to 90°, i.e., outside the direction of propagation of specular reflection of the dark field illumination. In some embodiments, the dark field illumination path is oriented to provide oblique illumination mode causing scattered light to be detected by the imaging sensor whose detection path is located outside the direction of propagation of specular reflection. The dark field imaging mode is aimed at collecting/detecting only/mainly scattered light. This results in a high-contrast image of defects or abnormalities (scatterers), as they appear as bright spots (bright specs) in the image.

In some embodiments, the tangential back-light illumination path and the dark field illumination path are oriented along substantially perpendicular direction one with respect to the other.

In some embodiments, the directions of the tangential back-light and dark field illumination paths define an angle being larger than one of the followings 90°, 100°, 120°, 130°, 140°, 150°, 160°, 170°.

In some embodiments, said dark-field imaging setup comprises a dark-field imaging sensor unit defining a dark-field detection path for detecting the scattering of said dark-field illumination from the contour region, thereby obtaining the dark-field image.

In some embodiments, the tangential imaging sensor unit is configured to collect said at least part of the tangential illumination from the contour outline and said scattering of the dark-field illumination from the contour region, thereby enabling to obtain image data comprising the tangential image of the contour outline with superposition of the dark field image of said contour region. In this case, the dark-field imaging setup may additionally comprise a dark-field imaging sensor unit defining an additional dark-field detection path for detecting the scattering of said dark-field illumination from the contour region, thereby obtaining the dark-field image.

The dark-field illumination unit may be configured to define multiple dark-field illumination paths of different incidence angles on the contour region.

The multiple dark-field illumination paths may be of angular orientations with respect to the contour region being imaged and with respect to said tangential illumination path and said dark-field detection path such that each of the tangential imaging sensor unit and the dark-field sensor unit is adapted to detect reflection and scattering of illumination from the contour region.

The tangential illumination unit may be configured and operable to generate the back-light tangential illumination of a visible or near visible spectral range, e.g., in the range of about 300 nm to 800 nm.

As used herein the term "about" refers to plus or minus 10 percent.

The tangential illumination unit may comprise at least one LED. The LED may be operable with a wavelength range of 380 to about 750 nanometers or 310 to about 1100 nanometers.

In some embodiments, the tangential dark field illumination unit comprises a plurality of illumination elements, wherein at least one of the plurality of illumination elements is positioned below or above the semiconductor structure. The at least one of the plurality of illumination elements may be positioned substantially in the same plane as the semiconductor structure and the tangential imaging sensor unit.

In some embodiments, the tangential imaging sensor unit is positioned in a substantially horizontal position. The optical axis of the tangential imaging sensor unit may be substantially parallel to at least one of the top or bottom planes of the wafer. The tangential imaging sensor unit may include at least one tangential imaging sensor element as well as light directing optical elements. Similarly, the at least one illumination unit may include at least one illumination source, as well as light directing optical elements, e.g., to focus and direct the illumination radiation onto the contour region.

The tangential back-light illumination defines the contour outline, as sensed by the tangential imaging sensor unit. The presence of back-light illumination enables to provide a silhouette of the edge, while a front light enables to provide a reflective image of the contour region. The back-light illumination may be positioned approximately opposite to the imaging sensor, illuminating the contour outline (i.e., stack outer diameter) and directed at the imaging sensor.

In some embodiments, the at least one tangential back-light illumination unit and the tangential imaging sensor unit optical axis are positioned in a substantially parallel direction one with respect to the other. As used herein, the term "substantially parallel direction" refers to an approximate parallel direction between the at least one tangential back-light illumination unit and the tangential imaging sensor unit optical axis. The respective directions can define an angle of less than 5, 10, 15, 20, 30 degrees.

In some embodiments, the tangential back-light illumination unit is positioned in a substantially opposite side to the tangential imaging sensor unit with respect to the semiconductor structure. As used herein, the term "substantially opposite" refers to an approximate opposite location of the tangential back-light illumination unit with respect to the tangential imaging sensor unit. The respective directions of each position can define an angle of less than 5, 10 or 15 degrees.

In some embodiments, the tangential imaging sensor unit is positioned such that its focal plane is placed at the contour outline of the wafer. Therefore, the tangential imaging sensor unit is positioned in a tangential direction to the contour outline (i.e. the wafer outer diameter) and is focused on the contour outline of the wafer, as it rotates.

In some embodiments, the inspection system of the present disclosure further comprises one or more additional imaging setups providing image data indicative of additional information related to abnormalities of the edge of the semiconductor structure. Such one or more additional imaging setup comprises at least one of the following: an apex imaging setup, an edge top plane imaging setup, and an edge bottom plane imaging setup.

The apex imaging setup is configured and operable to generate image data being indicative of an apex contour region of the edge of the semiconductor structure indicative of a layout of top-bevel zone, apex zone and bottom-bevel zone of the edge and of a bonding interface volume of the semiconductor structure.

The edge top plane imaging setup configured and operable to generate an image of a contour region of the edge of the semiconductor structure indicative of a layout of top near-edge zone, top bevel zone and apex zone of the edge of the semiconductor structure. Similarly, the edge bottom plane imaging setup configured and operable to generate an image of a contour region of the edge of the semiconductor structure indicative of a layout of bottom near-edge zone, bottom bevel zone and apex zone of the edge of the semiconductor structure.

In some embodiments, each of said one or more additional imaging setups is configured to define at least one additional illumination path and an associated additional detection path for imaging at least one additional contour region of the edge of the semiconductor structure at a location spaced-apart from said contour region being imaged by the tangential and dark-field imaging setups. This enables to perform substantially simultaneous imaging of different contour regions of the edge of the semiconductor structure, and enables imaging of the entire edge of the semiconductor structure along a circumference thereof during rotation of the semiconductor structure. The inspection system may thus further include a control unit (controller) configured and operable for synchronizing performance of image acquisition sessions by the imaging setups.

The apex imaging setup may comprise at least one illumination unit and an apex imaging sensor unit. The at least one illumination unit is configured and operable to provide at least one of bright-field illumination and back-light apex illumination, the bright-field illumination propagating towards the apex contour region of the edge of the semiconductor structure along a bright-field illumination path, and the back-light apex illumination propagating towards the apex contour region along at least one of back-light apex illumination paths being inclined with respect to a rotation axis of the semiconductor structure and forming grazing angles with, respectively, at least one of top and bottom surface regions of the edge. The apex imaging sensor unit is adapted for collecting at least a part of said back-light apex illumination and reflection of said bright-field illumination from the apex region of the edge.

In some embodiments, the back-light apex illumination is propagating towards the apex contour region along first and second apex illumination paths each being inclined with respect to a rotation axis of the semiconductor structure and forming a grazing angle with the top and bottom surface regions of the edge, respectively.

In some embodiments, one or more of the imaging setups is configured for imaging a bonding interface volume between two tiers of a multi-tier stack. As described above, "bonding interface" or "bonding interface volume" is the volume defined between two tiers of a multi-tier stack forming an interstitial space from the outer diameter (i.e. distal end) of the bonding material to the edge and bevels of the tiers of the multi-tier stack (i.e. the closest distal end of either of the top or bottom layers, as seen in the cross-section view).

The bonding interface volume is a narrow opening having a height increasing from its inner aspect at the edge of the bonding material radially outwards. It can also be defined as a or fissure, crevice, crack, cleft, split or wedge like opening. In some embodiments, the height of the interstitial space is less than 1, 5, 10, 15, 20, 50, 75 100, 150, 200, 300, 500, 750, 1000 microns. In some embodiments, the depth-to-thickness-ratio of the interstitial space is less than 0.1, 02, 0.5, 0.7, 1, 5, 10, 15, 20, 30, 50, 75 100. Inspection of the bonding interface can provide different types of defect data and variations along the edge of the semiconductor structure such as detecting the presence of particles (e.g. resist particles, embedded particles), debris, chips, stains, cracks, scratches, copper-overflow, delaminations, blisters, corrosion, as well as metrology data including debris' size and determining surface roughness as detailed further below.

The edge top plane imaging setup comprises an edge top plane illumination light source system and an edge top plane imaging sensor unit. The edge top plane illumination light source system comprises at least first and second illumination units, wherein the first illumination unit is configured and operable to generate bright-field illumination propagating along at least one bright-field illumination path towards a top edge contour region of the edge, and the second illumination unit is configured to generate back-light top plane illumination propagating along a top plane illumination path along an axis forming an angle $\theta$ with a semiconductor structure plane, such that $70 \leq \theta \leq 110$ and substantially along a detection path of the edge top plane imaging sensor unit. The edge top plane imaging sensor unit detects at least a part of said back-light top plane illumination propagating along said top plane illumination path and reflection of said bright-field illumination from said top-edge contour region, and generates said image of the contour region of the edge indicative of the contour outline, and layout of top near-edge zone, top bevel zone and apex zone of the edge.

Similarly, the edge bottom plane imaging setup comprises an edge bottom plane illumination light source system and an edge bottom plane imaging sensor unit. The edge bottom plane illumination light source system comprises at least first and second illumination units, wherein the first illumination unit is configured and operable to generate bright-field illumination propagating along at least one bright-field illumination path towards a bottom edge contour region of the edge, and the second illumination unit is configured to generate back-light bottom plane illumination propagating along a bottom plane illumination path along an axis forming an angle q with a semiconductor structure plane, such that $70 \leq \varphi \leq 110$ and substantially along a detection path of the edge bottom plane imaging sensor unit. The edge bottom plane imaging sensor unit detects at least a part of said back-light bottom plane illumination propagating along said bottom plane illumination path and reflection of said bright-field illumination from said bottom-edge contour region, and generates said image of the contour region of the edge indicative of the contour outline, and layout of bottom near-edge zone, bottom bevel zone and apex zone of the edge.

According to yet another broad aspect of the present disclosure, there is provided an inspection system for edge and bevel inspection of a semiconductor structure comprising: a plurality of illumination and imaging sensor units configured and operable to define at least a tangential imaging setup and a dark-field imaging set up, the tangential imaging setup being adapted to collect at least a part of back-light tangential illumination propagating along a tangential illumination path and interacting with a contour region of an edge of the semiconductor structure and generate a tangential image of a contour outline of the contour region, the dark-field imaging setup being adapted to collect scattering of a response of the contour region to dark-field illumination and generate a dark-field image of the contour region, thereby enabling detection of defect data of the edge and enabling to locate defects of the edge.

According to yet another broad aspect of the present disclosure, it provides a method for use in automatic edge and bevel inspection of semiconductor structures, comprising at least one of single-tier and multi-tier semiconductor structures, the method comprising:

illuminating at least one contour region of an edge portion of the semiconductor structure with illumination propagating towards said contour region along at least first and second differently oriented illumination paths comprising a first, back-light tangential illumination path and at least one second illumination path configured for at least one of dark-field and bright-field imaging modes;

detecting at least a part of said illumination propagating along the first illumination path towards the contour region, and detecting at least one of scattering and reflection responses of the contour region to the illumination being incident thereon from said at least one second illumination path; and generating image data indicative of a contour outline of said at least one contour region and indicative of defect data of said contour region.

It should be noted that the dark field sensor unit, if used, may be positioned adjacently to the tangential dark field illumination unit.

In some embodiments, the tangential back-light illumination unit is positioned in close proximity to the contour outline. The term "close proximity" may be defined as an adjacent location but non-contacting. The term "close proximity" in this situation, may be defined as an adjacent location but non-contacting and less than 1, 2, 3, 4, 5, 7, 10, 15, 20, 30, 50, 100, 200, 300, 500, 1,000 mm from the contour outline.

In some embodiments, the tangential imaging setup and the at least one additional imaging setup are positioned such that their respective imaging sensor units are configured and operable to collect reflected visible light from at least one of the semiconductor structure, an internal of external defect, a particle located on an edge and bevel region, a top surface or a bottom surface of the structure, during the structure rotation.

In some embodiments, the tangential imaging setup and at least one additional imaging setup are configured and operable to operate simultaneously during rotation of the semiconductor structure and to generate images of different segments/slices of the semiconductor structure at the same time.

In some embodiments, the tangential imaging setup and at least one additional imaging setup are configured and operable to obtain images being indicative of the same abnormalities/defects imaged/viewed from different angles, providing additional information being related to defect data.

In some embodiments, each of the tangential imaging setup, the apex imaging setup, the edge top plane imaging setup and edge bottom plane imaging setup is positioned at different locations along the perimeter/circumference of the semiconductor structure.

In some embodiments, at least one the apex illumination setup, edge top plane illumination setup or edge bottom plane illumination setup comprises a second back-light illumination unit being positioned in a substantially opposite side to the apex imaging sensor unit, edge top plane imaging sensor unit, or edge bottom plane imaging sensor unit respectively with respect to the semiconductor structure. The second back-light illumination unit is configured and operable to generate an illumination radiation and to illuminate a contour outline of the contour region of the semiconductor structure and the apex imaging sensor unit, edge top plane imaging sensor unit, or edge bottom plane imaging sensor unit respectively such that at least one of the apex imaging sensor unit, edge top plane imaging sensor unit, or edge bottom plane imaging sensor unit is configured and operable to collect reflected (visible) light from the contour region of the semiconductor structure respectively to thereby obtain a reflective image being indicative of profile of the edge portion of the semiconductor structure.

In some embodiments, at least one the apex illumination setup, edge top plane illumination setup or edge bottom plane illumination setup comprises a first illumination setup unit being positioned in a substantially parallel direction to the apex imaging sensor optical axis, edge top plane imaging sensor optical axis, or edge bottom plane imaging sensor unit optical axis, respectively. The first illumination setup unit is configured and operable to generate illumination directed to a contour region of the semiconductor structure such that at least one of the apex imaging sensor unit, edge top plane imaging sensor unit, or edge bottom plane imaging sensor unit is configured and operable to collect reflected (visible) light from the contour region of the semiconductor structure respectively to thereby provide a reflective image of the contour outline.

As indicated above, the inspection system preferably also includes a controller being configured and operable for receiving images from at least one the tangential imaging sensor unit, timing of image acquisition or image setup location, and for analyzing the images.

In some embodiments, the controller is configured and operable for identifying contour parameters of the semiconductor structure and/or determining defects data. The controller may be configured and operable for receiving and processing images of the tangential imaging setup and of at least one additional imaging setup; the images may be indicative of different views of the same contour region being inspected. The controller may be configured and operable for creating a 3D model of the edge portion of the semiconductor structure, and/or of the edge portion of a segment/slice of the semiconductor structure and/or or a defect within the edge portion.

In some embodiments, the controller is configured and operable for orienting the images provided by the tangential imaging setup and at least one additional imaging setup, such that different views of the same edge portion of a segment/slice of the semiconductor structure are displayed side-by-side. The controller may be configured and operable for synchronizing the operation of the tangential imaging setup with at least one additional imaging setup.

In some embodiments, at least one of the tangential back-light illumination unit, the tangential dark field illumination unit, a second back-light illumination unit of at least one the apex illumination setup, edge top plane illumination setup or edge bottom plane illumination setup comprise a fluorescence excitation light source. At least one of the tangential imaging sensor unit, tangential dark field sensor unit, an apex imaging sensor unit, an edge top plane imaging sensor unit, an edge bottom plane imaging sensor unit may also comprise a fluorescence detector.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 4A-4G show top view of different possible configurations of the optical system of the present disclosure defining back-light tangential and dark field imaging setups as well as their corresponding captured images;

DETAILED DESCRIPTION OF EMBODIMENTS

As described above, the technique of the present disclosure provides a novel approach for edge and bevel inspection (automatic inspection) of semiconductor structures, e.g., while progressing on a production line. Such semiconductor structure may be a single-tier structure or a multi-tier structure, and the technique of the present disclosure provides for high-quality imaging of the edge of the structure to identify and evaluate the quality of the edge profile and abnormalities/defects along the edge.

Figure 1A:
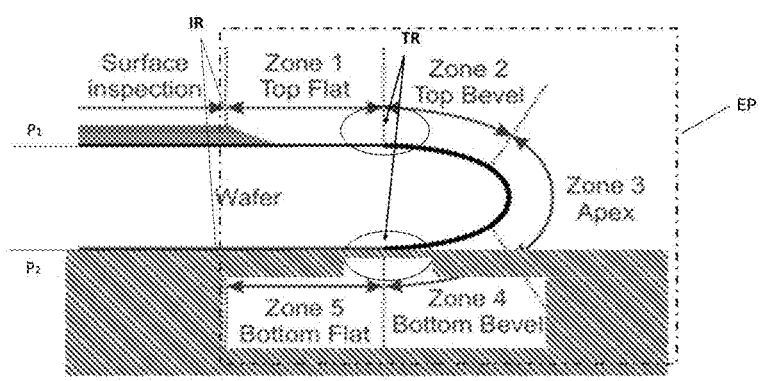
FIG. 1A shows a schematic cross-sectional view of the different zones defining the edge and bevels surfaces of a semiconductor structure exemplified by a wafer.
Figure 1B:
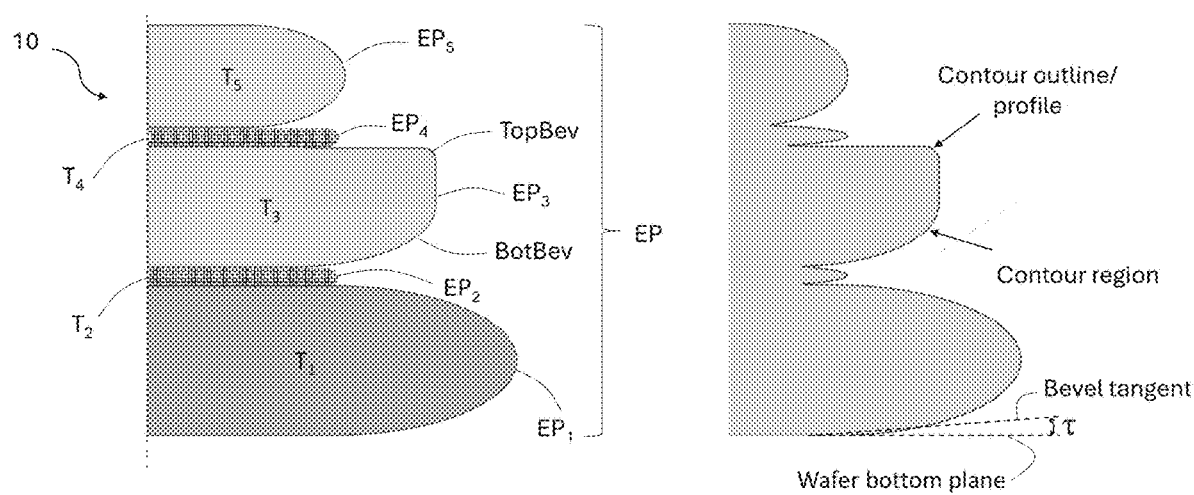
FIG. 1B shows a schematic cross-sectional view of a multi-tier semiconductor structure including a number N≥1 of tiers.

Reference is made to FIG. 1B which illustrates edge portion EP (at times referred to herein as "edge") of a semiconductor structure 10 including a number N≥1 of tiers. The structure 10 of the non-limiting example of FIG. 1B includes five tiers $T_1$-$T_5$, where bottom tier $T_1$ is a carrier (e.g., a glass carrier) carrying two integrated circuit based electronic devices forming, respectively tiers $T_3$ and $T_5$, and intermediate connecting tiers $T_2$ and $T_4$. Each i-th tear $T_i$ of the semiconductor structure 10 has its edge portion $EP_i$ having its characteristic edge profile. As noted above, in the case of a multi-tier structure (e.g., that of FIG. 1B), the edge portion of the structure presents a contour outline/profile formed by edge portions of all the tiers.

The contour outline shown in FIG. 1B bounds a contour region of the edge portion of the semiconductor structure (multi-tier structure), defined by the edge and bevel zones of the tiers of edge portion being imaged. As will be described further below, the contour region appears as a shadow image in tangential images used in the technique of the present disclosure. FIG. 1B also shows a "bevel angle", τ, (exemplified with respect to one of the tiers only) which is defined as the angle between the bevel tangent and the plane (bottom plane being shown in this example) of the semiconductor structure.

The bevel angle, actually, describes the transition from Bottom/Top Flat to Bottom/Top Bevel of the respective tier. As noted above, the "bevel angle", τ, can have any value in the range 0.1° to 10° and its determination is enabled by the technique of the present invention.

In some embodiments, the top and bottom bevels of a tier are symmetrical, e.g., tier $T_1$ and tier $T_5$ in FIG. 1B. In some embodiments, the top and bottom bevels of a tier are not symmetrical, e.g., tier $T_3$ in FIG. 1B, defining thus different respective top and bottom bevels, TopBev and BotBev.

Figure 2A:
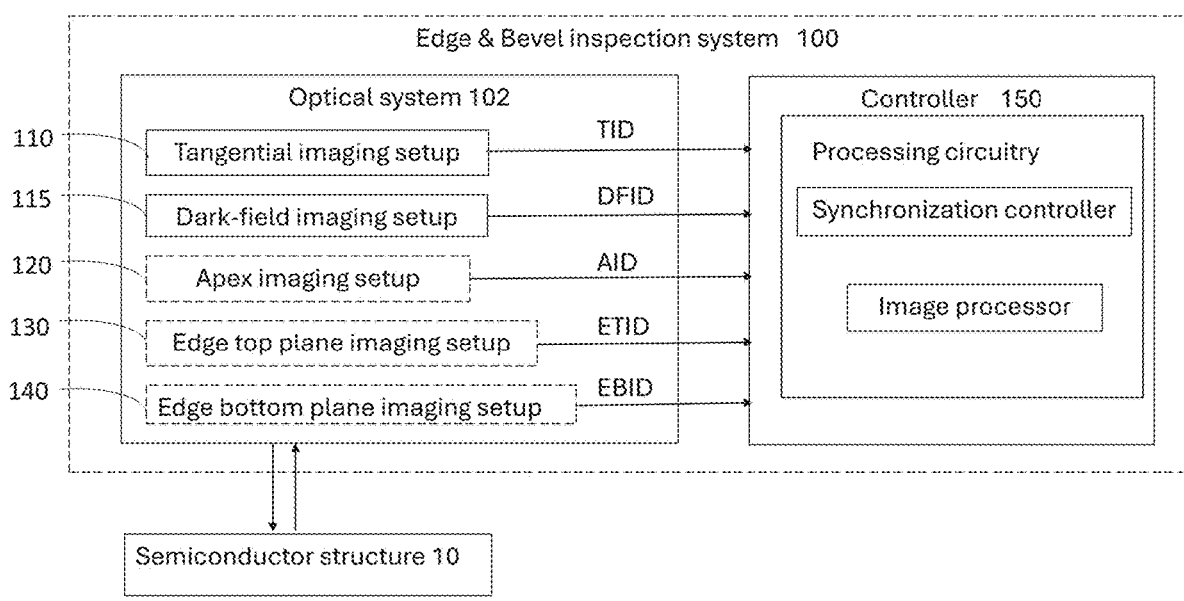
FIG. 2A illustrates, by way of a block diagram, the main functional parts of an inspection system for edge and bevel inspection of a semiconductor structure according to the present disclosure.

Reference is now made to FIG. 2A illustrating, by way of a block diagram, the main functional parts of an inspection system 100 of the present disclosure for edge and bevel inspection of a semiconductor structure 10 being a single-tier or multi-tier structure as described above. The inspection system 100, at times referred to herein as edge and bevel inspection system, is configured and operable for detecting abnormalities in the edge profile of the structure 10, while being capable of identifying abnormalities of different types induced by different effects during the structure manufacturing process.

The edge and bevel inspection system 100 includes an optical system 102 and a controller 150. It should be noted that the system 100 may be used in parallel with an automatic "top flat" surface inspection system (not shown here) which performs optical and/or electron beam inspection of the central top flat surface portion of the semiconductor structure, e.g., while progressing on a production line. It should also be noted that the controller 150 may be connectable to a control system of the top flat" surface inspection system.

The optical system 102 includes at least two imaging setups providing together image data indicative of two or more different types of information in relation to defect data (at times referred to hereinbelow as "abnormalities") of the edge profile.

Such at least two imaging setups include a tangential imaging setup 110 adapted for performing imaging of a contour region of the edge portion and providing tangential image data TID indicative of defect data in a contour outline of said contour region, and at least one of the following imaging setups; a dark-field imaging setup 115, an apex imaging setup 120, an edge top plane imaging setup 130, and an edge bottom plane imaging setup 140. The tangential and dark-field imaging setups, 110 and 115, may be oriented to perform different-type imaging of the same contour region of the edge portion. As for the above-listed other imaging setups, if used, they may be oriented to apply respective-type imaging to spaced-apart contour regions of the edge portion. This allows for properly inspecting the entire edge portion during rotation of the semiconductor structure.

The dark-field imaging setup 115 provides dark-field image data DFID indicative of location of abnormalities/defects along the profile of the contour region being imaged. The apex imaging setup 120 is adapted to provide apex image data AID indicative of a layout of a top-bevel zone, an apex zone and a bottom-bevel zone of the edge portion. The edge top plane imaging setup 130 is adapted for providing edge top image data ETID indicative of a layout of a top near-edge zone, a top bevel zone and an apex zone of the edge portion. The edge bottom plane imaging setup 140 provides edge bottom image data EBID indicative of a layout of a bottom near-edge zone, a bottom bevel zone and an apex zone of the edge portion of the semiconductor structure.

Figure 2B:
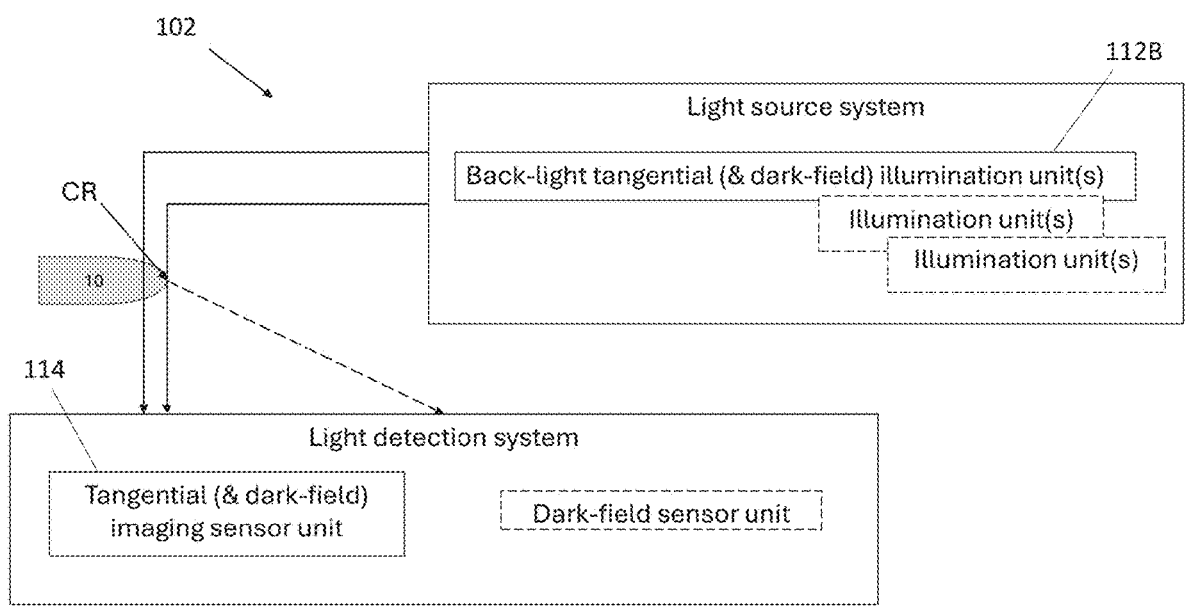
FIG. 2B schematically illustrates, by way of a block diagram, possible configurations of the optical system according to one embodiment of the present disclosure.

Preferably, the optical system 102 includes at least the tangential and dark-field imaging setups 110 and 115. FIG. 2B schematically illustrates, by way of a block diagram, the optical system 102 according to this embodiment of the present disclosure, where the tangential and dark-field imaging setups perform different types of imaging of the contour region CR of the edge portion EP. As shown in the figure, the optical system 102 includes a light source system and a light detection system defining the tangential and dark-field imaging setups. The light source system includes one or more illumination units, and the detection system includes one or more imaging sensor units. The term "imaging sensor unit" refers to any combination of hardware and software components that work together to capture, process, and transmit visual information.

The tangential imaging setup includes a tangential illumination unit 112B configured and operable to provide back-light tangential illumination propagating along a tangential illumination path TIP towards the contour outline COL of the contour region CR of the edge portion EP and substantially along a detection path DP of a tangential imaging sensor unit 114. The tangential imaging sensor unit 114 thus detects at least a part of the back-light tangential illumination propagating along the tangential illumination path TIP (i.e., at least part of the back-light tangential illumination interacting with the contour outline of the contour region while propagating from the tangential illumination unit 112B to the tangential imaging sensor unit 114), and generates the tangential image data TID indicative of a tangential image of a contour outline of the contour region of the edge portion. This enables detection of abnormalities (generally, defect data) of a profile of the contour region.

The dark-field imaging setup is configured and operable to collect/detect scattering of a response of the contour region to incident illumination (termed herein "dark-field illumination") from the contour region of the edge, thus enabling detection of a dark-field image indicative of location of abnormalities/defects along the profile of the contour region.

As indicated above such response of the contour region to the incident dark-field illumination may be formed by light components of the dark-field illumination itself being scattered from the defects (so-called "primary response") and/or may include so-called "secondary response" being light emitted by defects in response to dark-field illumination (i.e., fluorescent response), as the case may be. Considering detection of the primary response, the optical system is configured such that the dark field detection path is oriented substantially outside of direction of propagation of specular reflection of the dark-field illumination. Considering detection of the secondary response, orientation/position of the dark-field detection path is more flexible, since secondary emission such as fluorescence is typically less directional and propagates in various directions.

In the description below, the response of the contour region to the incident dark-field illumination is termed as "scattering of the dark field illumination". However, as described above, this should be interpreted broadly covering also secondary emission in response to interaction with the dark-field illumination.

As schematically shown in FIG. 2B and will be described and exemplified more specifically further below, the tangential and dark-field imaging setups may utilize separate illumination units and sensor imaging units (i.e., the tangential illumination unit and image sensor units, and dark-field illumination unit and dark-field sensor unit). Alternatively, the tangential and dark-field imaging setups may utilize a common illumination unit and/or a common imaging sensor unit.

For example, the tangential imaging setup and the dark-field imaging setup utilize tangential illumination and dark-field illumination units, respectively, and utilize at least the tangential imaging sensor unit, i.e., the detection path DP of the tangential imaging sensor unit serves also as a dark-field detection path DFDP (e.g., one of multiple dark-field detection paths). Thus, the dark-field imaging setup includes the dark-field illumination unit configured to direct dark-field illumination towards the contour region along at least one dark-field illumination path DFIP being which in this case is inclined with respect to the tangential illumination path TIP, and the tangential imaging sensor unit operates to (e.g., simultaneously) collect the at least part of the tangential illumination propagating along the tangential illumination path towards the contour outline and to collect scattering of the dark-field illumination from the contour region. This enables to obtain the tangential image of the contour outline with superposition of the dark field image of said contour region.

According to another example, the tangential and dark-field imaging setups may include separate sensor units and common illumination unit. In other words, the dark-field imaging setup may include a separate dark-field imaging sensor unit defining at least one dark-field detection path (e.g., substantially perpendicular to the tangential illumination path) for detecting the scattering of the tangential illumination from the contour region of the edge, thereby obtaining the dark-field image.

Figure 3A:
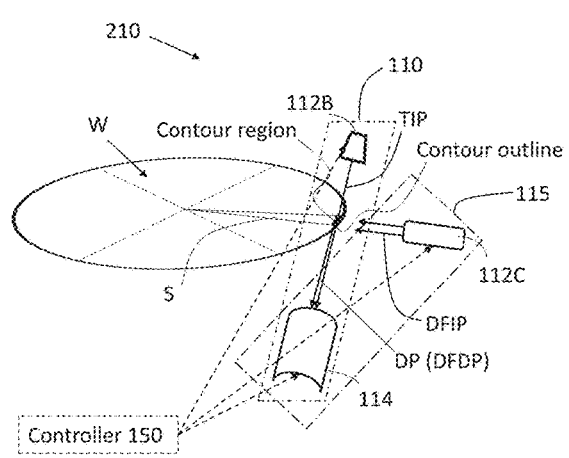
FIGS. 3A-3B show top perspective views of some possible embodiments of the optical system of the present disclosure defining back-light tangential imaging setup and dark-field imaging setup utilizing a common imaging sensor.
Figure 3B:
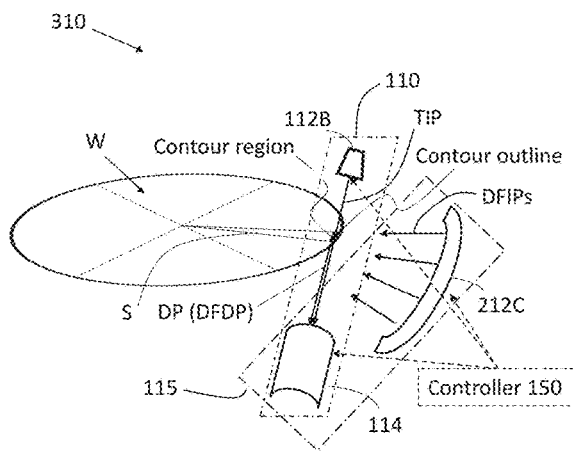

Reference is made to FIGS. 3A-3B showing top perspective views of optical systems 210 and 310 configured according to the two examples, respectively, of the above-described embodiment for edge and bevel inspection of a semiconductor structure (e.g., wafer) W. Each of the optical systems 210 and 310 is configured to define a tangential imaging setup 110 and a dark-field imaging setup 115 configured to perform imaging sessions with respect to a contour region within the edge portion of a segment/slice S of the structure W.

In particular, the optical system 210 shown in FIG. 3A includes the tangential imaging setup 110 being configured and operable to obtain tangential image data indicative of the contour outline of the contour region. The optical system 210 defines also the dark-field imaging setup 115 configured and operable to detect light scattered from the same contour region of the edge portion of the respective segment/slice of the wafer W (constituting a semiconductor structure), thereby enabling detection of a dark-field image of the contour region to enable identifying and locating abnormalities along the profile of the edge portion.

The tangential imaging setup 110 includes inter alia a tangential illumination unit 112B and a tangential imaging sensor unit 114. The tangential illumination unit 112B is configured and operable to provide back-light tangential illumination propagating along a tangential illumination path TIP towards the contour outline and substantially along a detection path DP defined by the tangential imaging sensor unit 114. The tangential imaging sensor unit 114 is thus capable of detecting at least a part of the back-light tangential illumination and generate image data being indicative of the contour outline of the contour region to thereby identify a profile of the edge portion. The image data provided by the tangential imaging sensor 114 and corresponding to detection of the back-light tangential illumination is indicative of the contour outline of the contour region. For example, such image data may be indicative of dimensions and surface properties of the contour outline.

The dark-field imaging setup 115 includes a dark field illumination unit 112C being configured and operable to direct dark-field illumination along at least one dark-field illumination path DFIP towards the same contour region. The dark-field illumination path DFIP has a certain angular orientation (is inclined) with respect to the tangential illumination path TIP (and thus also with respect to the detection DP of the sensor unit 114) and the detection path of the tangential imaging sensor unit 114 serves also as a dark-field detection path DFDP to collect/detect scattered dark-filed illumination from the contour region thus enabling the tangential imaging sensor unit 114 to generate a dark-field image of the contour region (indicative of location of abnormalities/defects within the contour region being imaged).

The dark field illumination is typically of higher intensity than the back-light tangential illumination. Detection of the scattering of the dark field illumination (e.g., by the imaging sensor unit 114) enables to detect external defects protruding from the contour region (appearing in the image as bright spots). The dark-field illumination path DFIP of the dark-field illumination unit 112C and the detection path DP (and also DFDP) of the tangential imaging sensor unit 114 may be properly oriented to eliminate or significantly reduce specular reflection of the dark-field illumination from the contour region to reach the imaging sensor 114.

In some embodiments, e.g., as exemplified in FIGS. 3A and 3B, the dark-field illumination path DFIP is substantially perpendicular to the detection path DP/DFDP of the tangential imaging sensor unit.

For example, the dark field illumination unit 112C is placed peripherally to the wafer W at a substantially small angle to the tangential imaging sensor 114 of less than 20, 30, 45, 60, 75, 90, 120, 150 deg, such that direct/specularly reflected light does not reach the imaging sensor 114.

The optical system 210 is thus capable to inspect the edge and bevel aspect of the contour region and to reveal the contour outline of the contour region, and to detect defects that are external to the contour outline, as well as defects that are not always visible from other angles.

The detection path DP of the tangential imaging sensor unit 114 is oriented substantially along a tangent line with respect to the contour outline of the contour region.

The tangential imaging sensor unit 114 typically includes an imaging sensor, such as a charge-coupled device (CCD) or a complementary metal-oxide-semiconductor (CMOS) sensor, which converts light into an electrical signal. The imaging sensor typically consists of an array (one- or two-dimensional array) of photosensitive elements, such as photodiodes or pixels. In some embodiments, the imaging sensor unit may include a camera, such as line camera, area camera. Time Delay Integration (TDI).

The imaging sensor unit also includes electronic circuits that control the sensor (light sensitive part) and amplify the signal being collected, as well as software algorithms that process the signal and create an image. The imaging sensor unit may also include additional components, such as lenses, filters, optical elements and image processors, to improve the quality and accuracy of the images.

FIG. 3B shows the optical system 310 which is configured generally similar to the optical system 210, namely includes the tangential imaging setup 110 including the back-light tangential illumination unit 112B and the tangential imaging sensor unit 114, and the dark-field imaging setup 115 including a dedicated dark-field illumination unit 212C and utilizing the tangential imaging sensor unit 114 for detection of scattering of the dark-field illumination from the contour region. However, in the example of FIG. 3B, the dark field illumination unit 212C is configured to define multiple (generally at least two) dark-field illumination paths DFIP providing different incidence angles of the dark-field illumination onto the contour region. This may be achieved by configuring the dark field illumination unit 212C with a plurality of illumination elements (e.g., a plurality of light directing elements associated with a common light emitter) being positioned in a spaced-apart relationship along an arc-shaped path defining the corresponding plurality of the dark-field illumination paths DFIPs.

At least one of these multiple dark-field illumination paths may be oriented substantially in the same plane as the wafer W and the detection path DP of the tangential imaging sensor 114. In some embodiments, the multiple illumination elements arranged along an arc-shaped path define the illumination path(s) below or above the wafer.

It should be noted that multiple illumination units/illumination elements can include the same or different units in the meaning that they may provide illumination of the same or different property(ies) (e.g., intensity, wavelength and/or polarization properties).

Optionally, at least one of the tangential and dark field illumination units 112B and 112C is configured and operable to generate collimated or near-collimated illumination. Additionally, or alternatively, the tangential and dark field illumination units 112B and 112C may be configured to provide fluorescence excitation light, and the tangential imaging sensor unit 114 may comprise a respective fluorescence detector.

Reference is made to FIGS. 4A-4G showing top views of some different examples of the optical system formed by the back-light tangential and dark field imaging setups as well as corresponding acquired images.

In particular, FIG. 4A shows an optical system 210 which defines a tangential imaging setup 110 (including back-light tangential illumination unit 112B and tangential imaging sensor unit 114) and a dark field imaging setup 115. configured as described above (e.g., having a dedicated dark-field illumination unit and utilizing the tangential imaging sensor unit for detection of the scattering of dark-field illumination). The back-light tangential illumination unit 112B is configured and operable to direct the tangential illumination towards the contour region and towards the tangential imaging sensor unit 114 (i.e., the tangential illumination and detection paths are substantially coinciding). The tangential imaging unit 114 provides image data enabling to identify the contour outline and provides image of the contour region enabling to identify defect data.

It should be understood that the back-light tangential illumination unit 112B may be configured and operable to provide a high intensity illumination, which, when the wafer is not present in the tangential illumination path, covers a significant portion of the sensor unit 114. Once the wafer is positioned such that at least a portion of the light rays of the back-light tangential illumination intersects the wafer edge plane, a smaller portion of the sensor is covered by/exposed to at least some of the light rays of the back-light tangential illumination.

Also shown in the figure is an image I acquired by the tangential imaging sensor unit 114. A dashed portion I' of the image I corresponds to an area/region of the light sensitive surface of the tangential imaging sensor unit exposed to the rays of the back-light tangential illumination not intersecting (not interacting with) the wafer. A black-color portion I" of the image I corresponds to an area/region of the light sensitive surface of the tangential imaging sensor unit exposed to the rays of the back-light tangential illumination interacting with the contour outline of the contour regions (of the segments/slices).

It should be understood that in the meaning of the tangential imaging setup (using back-light tangential illumination and tangential imaging sensor unit), the contour region corresponds to the area that is "blinded" on the sensor and the outline of this area corresponds to the contour outline being identified by the tangential imaging.

If the focal plane of the tangential imaging sensor unit 114 is placed at the contour outline of the contour region, a clear sharp image of the contour outline is obtained. It should be understood that if the contour region being imaged presents a smooth edge and bevel surface, an image obtained by the tangential imaging sensor unit 114 corresponds to a cross-sectional view of the contour region in which the anomalies of the contour region and the contour outline of the contour region can be clearly identified and measured. If the surface is not smooth, the image obtained by the tangential imaging sensor unit provides less accurate detectable data caused by scattering of the dark-field illumination towards the tangential imaging sensor unit 114.

The tangential illumination path TIP and the at least one dark field illumination path DFIP define an angle α being larger than one of the followings 90°, 100°, 120°, 130°, 140°, 150°, 160°, 170°. In this specific and non-limiting example, the dark field illumination path is oriented substantially perpendicular with respect to tangential illumination path and tangential detection path.

FIG. 4B shows the same/similar optical system 210 as that of FIG. 4A performing imaging of a contour region of the wafer edge having an external defect D protruding from the wafer surface. The image I acquired by the tangential imaging sensor unit 114 is formed by detection of at least part of the tangential illumination and by detection of scattering of the dark-field illumination from the contour region. A bright portion (bright spot) of the image I corresponds to detection of the scattering of dark-field illumination from the defect D (also separately shown in an image $I_1$), superposed with the cross-sectional view of the contour region, in which the contour region and the contour outline can be clearly identified and measured, as shown also in image $I_2$.

As also shown in FIG. 4B by dashed lines, in case the dark field illumination path DFIP' is incident on a contour region having a higher roundness (i.e., less flatness), reflection of the dark field illumination may also propagate along the detection path DP (DFDP) of the sensor unit 114 and thus be collected by the sensor unit 114 together with scattering (if any) of the dark field illumination from scatterers that might be present on the contour region. This may provide additional information about the contour region.

It should be noted that distinguishing between detection of the back light tangential illumination and the scattering and/or reflection of the dark field illumination can be implemented by using different wavelengths for the back light tangential illumination and dark field illumination, and configuring the sensor unit 114 with proper color functionality. Alternatively, or additionally, in order to properly distinguish between detection of the reflection and scattering of the dark-field illumination from the contour region being imaged, to thereby provide high contrast imaging of defects, if any, the dark field illumination may be polarized, keeping in mind that interaction of the polarized light with particles (scatterers) on the contour region destroys polarization of light.

FIG. 4C shows the optical system generally similar to the above-described optical system 310 of FIG. 3B including the back-light tangential illumination unit 112B and tangential imaging sensor unit 114, and the dark-field illumination unit 212C providing multiple dark-field illumination paths DFIP and DFIP' of different incidence angles on the contour region (e.g., having a plurality of illumination elements arranged in a spaced-apart relationship along an arc-shaped path). The optical system is configured for imaging a contour region having an external defect D protruding from the surface of the contour region. Image I acquired by the tangential imaging sensor unit 114 includes bright spots corresponding to the detection of scattering of the dark-field illumination from the defect D superposed with the cross-sectional view of the contour region in which the contour region and the contour outline can be clearly identified and measured. The dark-field scattering from the defect D is represented in this specific and non-limiting example, by two bright spots (bright specs).

As also exemplified in FIG. 4C, the plurality of dark field illumination paths may include dark field illumination paths DFIP and DFIP' being incident on the contour region with angles of different angular ranges $\beta 2$ and $\beta 1$ (each of which may be higher than 90° degrees or may be $0 \leq \beta 1$, $\beta 2 \leq 180°$ with respect to the detection path of the sensor unit 114. In this specific non-limiting example, the use of such multiple dark field illumination paths DFIP and DFIP' provides that the sensor unit 114 detects scattering, by the defect D, of the illumination incident on the contour region with angle(s) of incidence in the angular range β2 and detects the illumination interacting with the defect and propagating along almost specular reflection paths.

In some embodiments such different illumination units may for example be simultaneously operated or may be operated in timely separated sessions (or may use different wavelengths), as the case may be.

FIG. 4D shows an optical system 410 performing imaging of a contour region having an external defect D protruding from the surface of the contour region. The optical system 410 includes a tangential imaging setup 110 formed by a back-light tangential illumination unit 112B being configured and operable to direct back light tangential illumination towards the contour outline of the contour region and towards the tangential imaging sensor unit 114, and a dark field imaging setup formed by a dark-field illumination unit 312C and the tangential imaging sensor unit 114. Here, the dark-field illumination unit 312C includes an illumination source $312C_1$ being configured and operable to generate dark-field illumination and an optical element $312C_2$ being configured and operable to focus the dark-field illumination onto the contour region. Also, as shown in the figure, the dark-field illumination path DFIP is oriented with a certain angle (not necessarily perpendicular) with respect to the tangential illumination path and thus also detection path DP. The corresponding image I provided by the tangential imaging sensor unit 114 includes a bright portion (bright spot), corresponding to the detection of the scattering of the dark-field illumination from the defect D, superposed with the cross-sectional view of the contour region, in which the contour region and the contour outline can be clearly identified and measured.

Figure 4E:
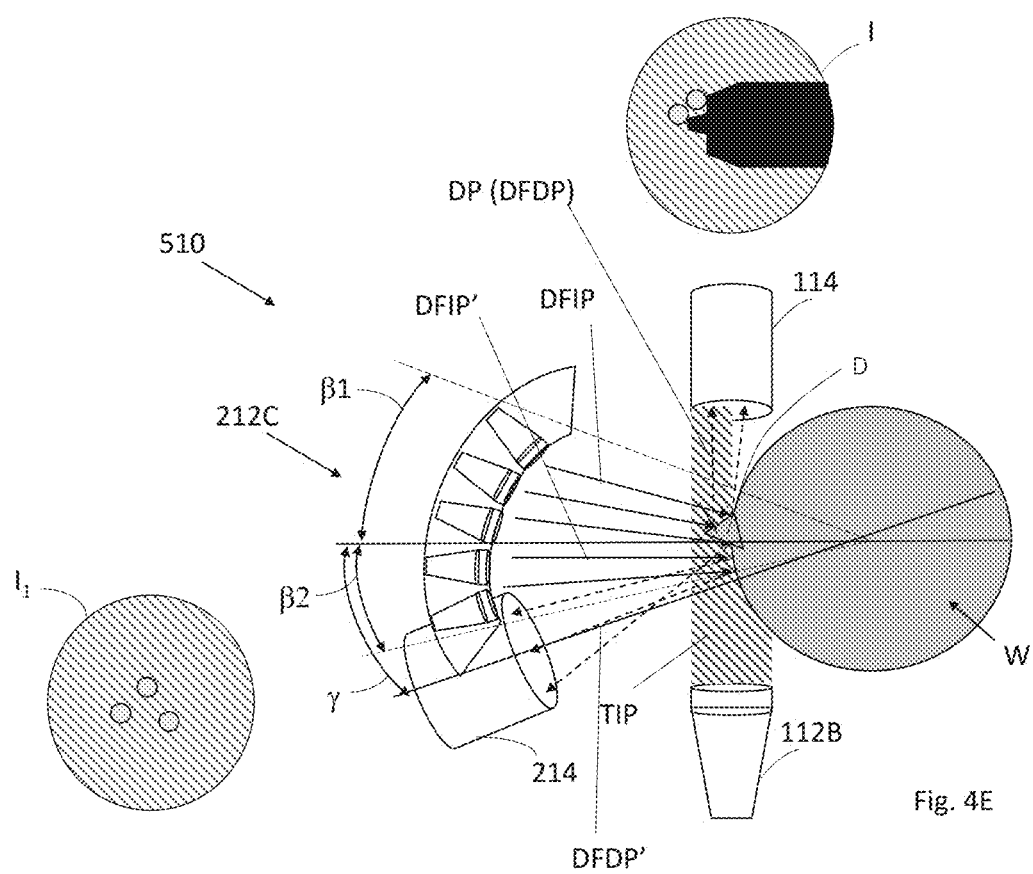

FIG. 4E shows an optical system 510 performing imaging of a contour region having an external defect D protruding from the surface of the contour region. The optical system 510 includes a back-light tangential illumination unit 112B, including a tangential illumination unit 112B configured and operable to direct back light tangential illumination towards the contour outline of the contour region and towards the tangential imaging sensor unit 114, and a dark-field imaging setup. In this example, the dark-field imaging setup includes: a dark field illumination unit 212C, which in the present example defines multiple dark-field illumination paths DFIP, DFIP' of different incidence angles β1, β2 on the contour region (e.g., including a plurality of illumination elements arranged in a spaced-apart relationship along an arc-shaped path); the tangential imaging sensor unit 114; and a separate dark field imaging sensor unit 214 (e.g., positioned on the same side of the dark field illumination unit 212C) defining an additional dark-field detection path DFDP' for detecting the scattering of dark-field illumination from the contour region, thereby obtaining an additional dark-field image.

For example, as shown in the figure, the dark field imaging sensor unit 214 may be adjacent to the dark field illumination unit 212C, however, the configuration of optical system 510 is not limited to this adjacent positioning.

This configuration provides that the tangential imaging sensor unit 114 detects scattering of the illumination produced by illumination unit 212C and being incident on the contour region with angle(s) of the angular range β2, and reflection of the illumination being incident on the contour region with angle(s) of the angular range β1; and the dark field imaging sensor unit 214 detects scattering of the illumination being incident on the contour region with angle(s) of the angular range β1, and reflection of the illumination being incident on the contour region with angle(s) of the angular range β2. In the figure, γ refers to angle between the optical axis of the sensor unit 214 and an axis passing through the contour region and center of the structure W.

Typically, angle γ can be in the range of 0°-88° or 0°-(−88°).

An image I provided by the tangential imaging sensor unit 114 includes a bright portion corresponding to the scattering of the dark-field illumination from the defect D superposed with the cross-sectional view of the contour region in which the contour region and the contour outline can be clearly identified and measured. An image $I_1$ provided by the dark field imaging sensor unit 214 is indicative of the scattering from the defect D and includes bright spots-three such bright spots in this specific and non-limiting example.

It should be noted that the imaging setup formed by the dark field illumination unit 212C, defining the multiple illumination paths of different angular orientations as described above, and the imaging sensor unit 214 may operate as the apex imaging setup (as will be described below) having the functionality of the dark field imaging setup. This can be achieved by configuring the illumination unit 212C such that it defines one or more illumination paths forming a dark-field imaging setup with the imaging sensor unit 214 to enable detection of substantially the scattering of the respective illumination from the contour region, and one or more illumination paths forming a bright-field imaging setup with the imaging sensor unit 214 to enable detection of substantially specular reflection of the respective illumination (preferably with nearly normal light propagation scheme).

If distinguishing between simultaneous detection of reflected and scattered light components by the same sensor unit is needed, this can be achieved as described above.

FIG. 4F exemplifies yet another possible configuration of the optical system 610 configured to define a back-light tangential imaging setup and a dark-field imaging setup configured to apply these types of imaging to the same contour region. In this example, the optical system 610 includes an illumination unit 212B, a tangential imaging sensor unit 114, and a dark-field imaging sensor unit 214. The illumination unit 212B is configured and operable to provide illumination propagating along multiple (generally at least two) illumination paths of different incidence angles on the contour region. This may be achieved by using two or more illumination elements arranged in a spaced-apart relationship along an arc-shaped path. These multiple illumination paths include the back-light tangential illumination path TIP and one or more dark-field illumination paths DFIP. The dark-field imaging sensor unit 214 defines a dark-field collection path DFDP' of a proper angular orientation with respect to the dark-field illumination paths DFIP to collect/detect scattering of the illumination from the contour region, while eliminating or at least significantly reducing collection of specular reflection of said illumination.

It should be noted that, in some embodiments, at least one of the back-light tangential and dark field illumination units (at least one of units 112B and 112C in FIGS. 3A, 4A, 4B, at least one of units 112B and 212C in FIG. 3B, at least one of units 112B and 212C in FIGS. 4C and 4E, at least one of units 112B and $312C_1$ in FIG. 4D, at least one of illumination units 212B in FIG. 4F), is configured and operable to generate collimated or near-collimated illumination. The back-light tangential illumination unit 112B and dark field illumination units 112C, 212C, $312C_1$ may include a collimated light source, with near zero divergence generating a beam of light where all rays are substantially parallel. Additionally, or alternatively, the back-light tangential illumination units 112B, 212B and dark field illumination units 112C, 212C, 312C$_1$ may include a fluorescence excitation light source and the tangential imaging sensor unit 114 and/or the dark field imaging sensor unit 214 may comprise a fluorescence detector.

FIG. 4G shows the optical system 710 configured generally similar to the above-described optical system of 310 of FIG. 4C including the back-light tangential illumination unit 112B and tangential imaging sensor unit 114, and the dark-field illumination unit 212C providing multiple dark-field illumination paths DFIP and DFIP' of different incidence angles on the contour region (e.g., having a plurality of illumination elements arranged in a spaced-apart relationship along an arc-shaped path). The optical system is configured for imaging a contour region having a defect D in the form of a groove/recess in the surface of the contour region. Image I acquired by the tangential imaging sensor unit 114 includes bright spots corresponding to the detection of scattering of the dark-field illumination from the defect D superposed with the cross-sectional view of the contour region in which the contour region and the contour outline can be clearly identified and measured. The use of such multiple dark field illumination paths DFIP and DFIP' provides that the sensor unit 114 detects scattering, by the defect D (groove), of the illumination incident on the contour region with angle(s) of incidence in the angular range β2 and detects the illumination interacting with the defect and propagating along almost specular reflection paths. As noted above, in some embodiments, different illumination units 212C may be simultaneously operated or may be operated in timely separated sessions (or may use different wavelengths), as the case may be.

Figures 5A, 5B, 5C:
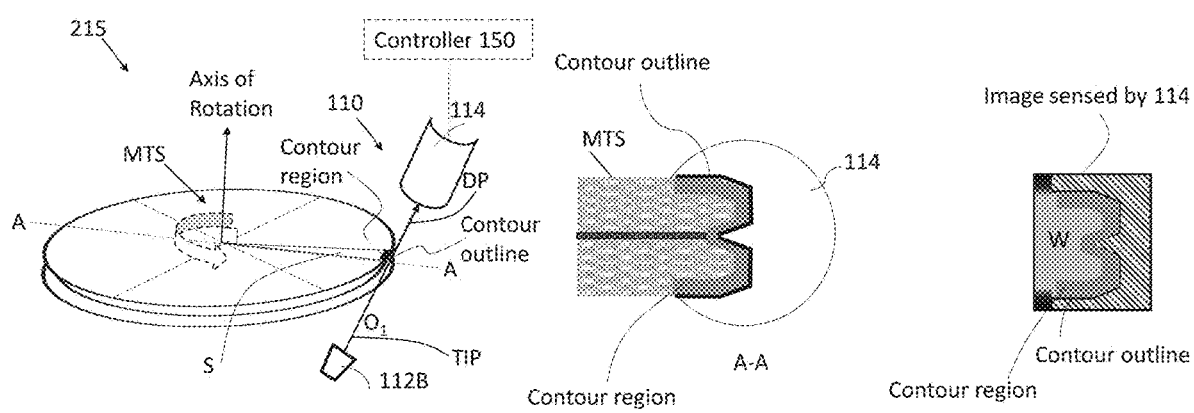
FIGS. 5A-5C schematically exemplify the configuration of the tangential imaging setup (FIG. 5A) performing imaging on a multi-tier structure; cross-sectional views of images of a contour region being bounded by a contour outline (FIGS. 5B-5C) being captured by such tangential imaging setups.

Reference is made to FIGS. 5A-5C more specifically illustrating the operation of the back-light tangential imaging setup suitable to be used in an optical system, denoted here 215, of the present disclosure, and images provided by such back-light tangential imaging setup. It should be understood that for the purposes of the present disclosure, the optical system 215 further includes one or more additional imaging setups (as described above), preferably includes at least the dark-field imaging setup which is not shown in the figure. Such dark-field imaging setup may be implemented according to any one of the above-described examples. In this example, the semiconductor structure being inspected (imaged) is a multi-tier stack MTS.

The back-light tangential imaging setup 110 includes a tangential illumination unit 112B and a tangential imaging sensor unit 114, where tangential illumination unit 112B is adapted to generate and direct back-light tangential illumination along a tangential illumination path TIP towards the contour outline of the contour region and towards a tangential imaging sensor unit 114. In the simplest example, the tangential illumination unit 112B is positioned in the same tangential direction in which a tangential imaging sensor unit 114 is positioned, i.e. the optical axes of units 112B and 114 substantially coincide such that the illumination and detection paths are substantially parallel and at least partially overlapping.

In the example of FIG. 5A, the tangential imaging setup 110 is configured and operable to generate image data indicative of a tangential image of the contour outline of the contour region of the edge portion of the respective segment/slice of the structure, which in the present example is configured as a multi-tier stack MTS. The generated image data thereby enables to identify the contour outline and detect abnormalities of a profile of the edge of the multi-tier stack MTS. As described above, the tangential imaging sensor unit 114 is configured and operable to detect at least a part of the back-light tangential illumination from the contour outline and generate the image data being indicative of a side view of the contour outline. The tangential illumination unit 112B provides back-light tangential illumination propagating along the tangential illumination path towards the contour region of the multi-tier stack MTS and towards the imaging sensor 114.

As shown in the figure, the back-light tangential illumination path defined by the tangential illumination unit 112B (e.g., optical axis O$_1$ of unit 112B) and the detection path defined by the tangential imaging sensor unit 114 (e.g., optical axis of unit 114) are substantially parallel and overlapping. This can for example be achieved by positioning the tangential illumination unit 112B at a substantially opposite side to the tangential imaging sensor unit 114 with respect to the multi-tier stack MTS. As shown in this specific and non-limiting example, the optical axis O$_1$ of the back light tangential illumination unit 112B may be positioned substantially in the plane of the multi-tier stack MTS, e.g., considering horizontal orientation of the stack MTS, the optical axis O$_1$ of the tangential imaging sensor unit 114 is oriented in a substantially horizontal position and be substantially parallel with respect to the bottom and top layers of the multi-tier stack MTS. The tangential imaging sensor unit 114 may be configured to be focused on the contour outline of the contour region of the respective segment/slice of the multi-tier stack MTS, i.e., the sensor unit 114 can be configured and operable to obtain a focused image of the contour outline.

In some embodiments, the back-light tangential illumination unit 112B is positioned in close proximity to the contour outline being less than 1, 2, 3, 4, 5, 7, 10, 15, 20, 30, 50, 100, 200, 300, 500, 1,000 mm from the contour outline.

It should be noted, although not specifically shown in the figure, that the back-light tangential illumination unit may include a plurality of optical elements.

It should also be noted that, generally, each illumination unit of the inspection system of the present disclosure may include a light source having a narrowband spectrum, such as an LED of visible or near visible wavelength e.g., a green LED. The narrowband spectrum width may be less than 100, 150, 200, 250 nanometers.

In particular, the back-light tangential illumination unit may be implemented by using a green LED. The green LED enables a clear definition of the contour outline, in particular if the at least one additional imaging setup (e.g. dark-field imaging set up, and/or apex imaging setup, and/or edge top/edge bottom imaging setup(s)) utilizes illumination having different spectral properties, e.g. white light. Further, in some embodiments, an industrial color sensor is designed to be more sensitive at the near green wavelength (550 nm), enabling to collect more photons in contrast to shorter or longer wavelengths. However, this example is not limiting, and the tangential illumination unit may also include another light source such as a LED producing light within the range of visible or near visible spectrum, for example, a LED emitting light of wavelength(s) within the range of 380 to about 750 nanometers or 310 to about 1100 nanometers e.g. 550 nanometers±50 nanometers. In some embodiments, tangential illumination unit may be implemented by using a fluorescence excitation light source.

The use of back-light tangential illumination setup enables to obtain a silhouette (profile) of the edge, which allows to reveal the contour outline of the wafer (stack), and to detect defects/abnormalities that are external to the contour outline (i.e., protrude outwardly from contour outline), as well as defects that are not always visible from other angles. Viewing the edge and bevel aspect of the wafer stack, tangentially to the contour outline (i.e. outer diameter) is performed with a backlight that provides a silhouette of the edge. The captured image data being indicative of the contour outline may include the exact dimensions and surface properties of the contour outline. The use of the dark-field illumination setup together with the back-light tangential illumination setup provides for imaging and locating the external defects, e.g., elements, particles on the contour region.

Turning back to FIG. 2A, the inspection system includes controller 150 which is configured as a computerized system including inter alia data input/output and memory utilities (not shown) and a processing circuitry, which includes a synchronization controller for synchronizing operation of the imaging setups of the optical system 102, and an image processor. The processing circuitry of the controller 150 is configured and operable to be responsive to input data comprising image data provided by the tangential imaging sensor unit 114 and that of the at least one additional imaging setup (preferably at least dark-field imaging setup), timing of image acquisition(s) and possibly also image setup parameters, to analyze the input data and generate output data about abnormalities on the edge portion of the semiconductor structure. The image setup parameters refer to the type and the position of each different imaging setup. The analysis of the image data includes identifying a contour outline or the contour parameters of the semiconductor structure and the defects-related data.

Returning back to the example of FIGS. 5A-5C, FIG. 5A shows a cross section line A-A along which images of the contour region being bounded by the contour outline can be captured by tangential imaging sensor unit 114, and FIGS. 5B-5C show cross sectional images of the contour region being bounded by a contour outline of this cross sectional view.

In this connection, it should be noted that the optical system configuration of FIG. 5A enables to accurately identify the contour outline, while imaging of the contour region itself can be further optimized by using an additional imaging setup utilizing front (bright) light as will be detailed and exemplified further below.

The cross-sectional image shown in FIG. 5C is captured using the tangential imaging setup, i.e., back-light tangential illumination 112B and tangential imaging sensor unit 114. The contour outline defines the perimeter/circumference of the contour region and provides a visual representation of its shape and boundaries. The contour outline can take different shapes. In this specific example, it defines the shape and the height (thickness) of the contour line and thus that of the profile of the edge portion of the respective segment/slice of the multi-tier stack MTS from a side view. If the different tiers of the multi-tier stack have different lateral dimensions (e.g., diameters), the contour outline of the multi-tier stack may define a non-symmetrical profile. The contour region being inspected is a region within the depth of field of the imaging sensor, adjacent to the contour outline.

The contour outline parameters include at least one of the dimensions (geometry, geometry variation over the circumference), color, color variations over the circumference of the segment/slice, and the surface properties of the contour outline, the outer dimension (e.g., diameter) of the semiconductor structure (e.g., wafer), bevel(s) profile (geometry including height and shape, geometry variation over the circumference, smoothness), height and shape, stack contour outline, bonding interface of top and bottom surfaces, the connection material outer aspects, centricity of tiers with respect to each other, or flatness of tiers.

Figure 6:
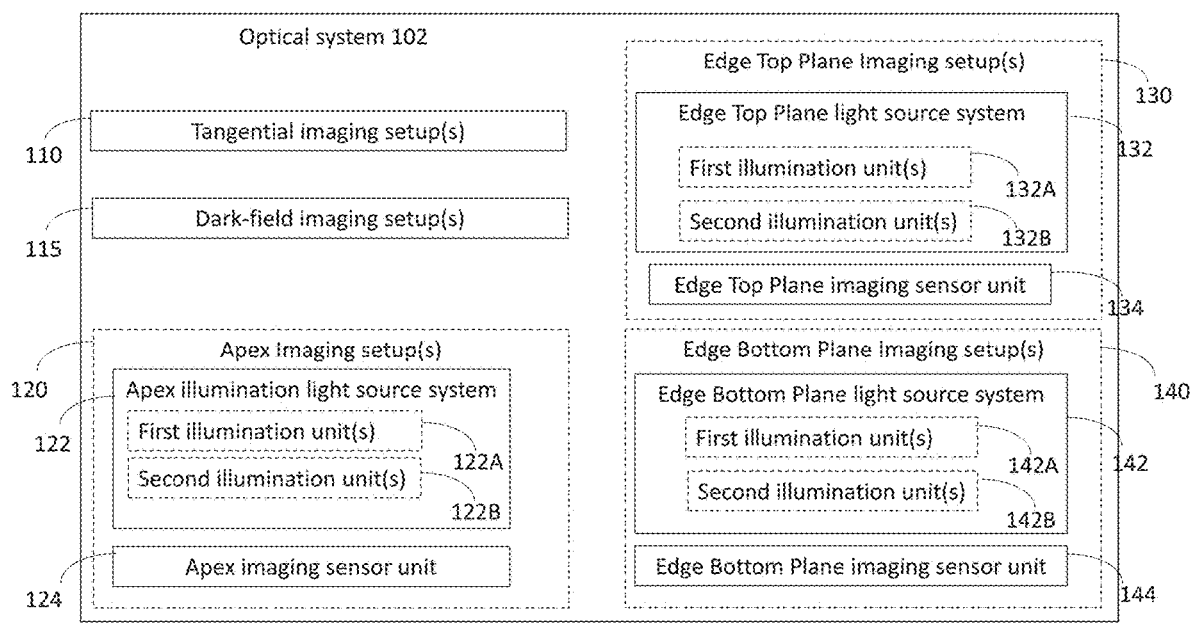
FIG. 6 is a block diagram showing the main functional parts of the optical system according to the teachings of the present disclosure.

Reference is made to FIG. 6 showing the main functional parts of the optical system 102 according to the technique of the present disclosure. As shown in this figure and also described above with reference to FIG. 2A, the optical system 102 includes the tangential imaging setup 110 and at least one additional imaging setup being at least one the following: a dark-field imaging setup 115, an apex imaging setup 120, an edge top plane imaging setup 130, and/or an edge bottom imaging setup 140.

Preferably the optical system 102 includes the tangential imaging setup and the dark-field imaging setup. In such case, additional imaging setup(s) include at least one of the apex imaging setup 120, the edge top plane imaging setup 130, and/or the edge bottom imaging setup 140. Each of the at least one of these additional imaging setups is configured and operable to perform imaging of at least one respective contour region by utilizing at least one respective imaging sensor unit configured and operable to collect reflected and/or scattered light from the respective at least one contour region (within the respective zone(s) of the edge portion of the semiconductor structure). Images provided by all the imaging setups of the optical system provide information about at least one of the following: contour line of the contour region, contour region, an internal of external defect within the contour region, particle(s) located on the contour region being imaged, a top surface or a bottom surface of the single- or multi-tier structure. All or at least some of these different images can be obtained during the structure/wafer rotation.

Typically, the wafer stack is rotating at a speed of less than 40, 60, 80, 120, 150, 180, 210, 240, 270, 360 deg/sec.

In some embodiments of the present disclosure, the optical system 102 includes the tangential imaging setup 110 and at least one apex imaging setup 120, edge top plane imaging setup(s) 130 or edge bottom plane imaging setup(s) 140. With such configuration of the optical system, operation of the imaging setups can be synchronized to perform imaging sessions, simultaneously or according to a certain time pattern, during the wafer rotation and generate images of different contour regions of the structure (e.g., different slices of the multi-tier stack), e.g., at the same time.

Moreover, the tangential imaging setup 110 and the at least one additional imaging setup 120, 130 or 140 may be configured and operable to obtain images of the same contour region (and thus the same or different abnormalities/defects on said contour region), as will be shown below with respect to FIG. 11, providing additional information about defect-related data.

It should be noted that such configuration of the optical system of the present disclosure, i.e. use of the tangential imaging setup in combination with the at least one of the imaging setups 115, 120, 130 and 140, defining illumination and/or detection paths of different angular orientations, provides viewing the zones of the edge portion of the semiconductor structure (e.g., wafer stack), to reveal defects that can only be detected at specific angles (i.e., defects that might not be visible from some angles). Moreover, this configuration also enables viewing the zones of the edge portion with multiple imaging setups performing imaging sessions at different angles, to provide additional information needed for inspection and metrology of defects (as compared to the information available by a single imaging setup).

The tangential imaging setup 110 and the dark-field imaging setup 115 were described in detail above. In the following, the additional imaging setups 120, 130 or 140 are exemplified in detail.

The apex imaging setup 120 includes a light source system 122 and at least one apex imaging sensor unit 124. The light source system 122 is configured and operable to provide apex illumination propagating along an apex illumination path towards an apex contour region. The apex contour region is a region at the apex of the edge portion of the segment/slice of the semiconductor structure (at times called "wafer apex") shown as Zone 3 in FIG. 1A. In case of a multi-tier structure, the apex contour region is formed by multiple apex sub-regions of respective multiple tiers including bonding interface volumes being formed between any two adjacent tiers of such multi-tier structure. The apex imaging sensor unit 124 is configured and operable to generate image data being indicative of a layout of top-bevel zone, apex zone and bottom-bevel zone of the edge, and in case of multi-tier structure, also indicative of a bonding interface volume(s). The apex illumination light source system 122 includes at least first and second apex illumination units 122A and 122B. The first apex illumination unit 122A defines a first apex illumination path towards the apex contour region of the edge which has angular orientation with respect to the detection path of the apex imaging sensor unit 124 to provide bright-field imaging mode. The second apex illumination unit 122B generates back-light apex illumination propagating along a second apex illumination path oriented along a second apex axis intersecting with a rotation axis of the structure and forming a grazing angle with a structure plane, such that the back-light apex illumination is incident on at least one of top or bottom surface regions, respectively, of the edge portion.

Figure 8A:
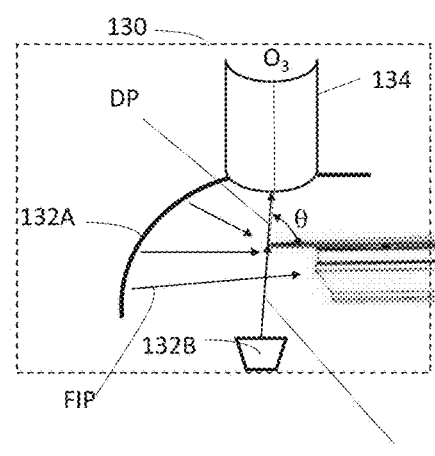
FIGS. 8A-8B shows a side view of the two imaging setups of FIGS. 7B-7C, respectively, being capable of inspecting (concurrently) a contour outline of the edge top plane and the edge bottom plane of a multi-tier structure according to some embodiments of the present disclosure.
Figure 8B:
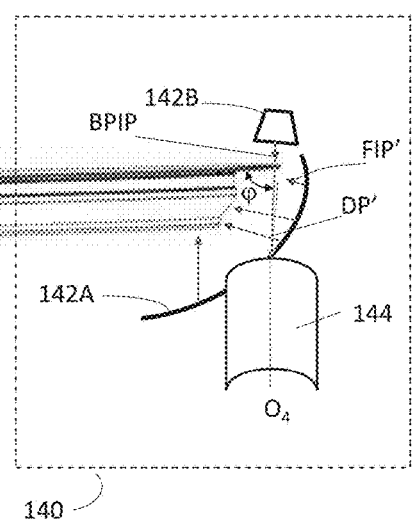

Reference is made to FIGS. 8A-8B showing the edge top plane imaging setup 130 including an edge top plane light source system 132 and an edge top plane imaging sensor unit 134 configured and operable to generate image data being indicative of atop view of an edge of a top surface of the contour region of the edge portion of the segment/slice of the semiconductor structure. Specifically, the edge top plane imaging setup 130 is configured and operable to generate an image of the contour region indicative of a layout of top near-edge zone (Zone 1), top bevel zone (Zone 2) and apex zone (Zone 3) of the edge portion of the respective segment/slice of the structure. The edge top plane light source system 132 includes at least a first top plane illumination unit 132A and a second top plane illumination unit 132B. The first top plane illumination unit 132A is configured and operable to define a first illumination path towards a top-edge contour region of the edge portion which has angular orientation with respect to the detection path of the edge top plane imaging sensor unit 134 to provide bright-field imaging mode. The second top plane illumination unit 132B generates back-light top plane illumination, propagating along a top plane illumination path TPIP along an axis forming a certain angle $\theta$ with the structure plane. Such angle is typically in the range $70 \leq \theta \leq 110$.

The edge bottom plane imaging setup 140 includes an edge bottom plane light source system 142 and an edge bottom plane imaging sensor unit 144 being configured and operable to generate image data being indicative of a bottom view of an edge of a bottom surface of the semiconductor structure. Specifically, the edge bottom plane imaging setup 140 is configured and operable to generate an image of a contour region of the edge of the structure indicative of a layout of bottom near-edge zone (Zone 5), top bevel zone (Zone 4) and apex zone (Zone 3) of the edge portion. The edge bottom plane illumination light source system 142 includes at least a first illumination unit 142A and a second illumination unit 142B. The first bottom plane illumination unit 142A is configured and operable to define a first illumination path towards a bottom-edge contour region of the edge which has angular orientation with respect to the detection path of the edge bottom plane imaging sensor unit 144 to provide bright-field imaging mode. The second top plane illumination unit 142B generates back-light bottom plane illumination propagating along a bottom plane illumination path BPIP along an axis forming an angle $\varphi$ with a semiconductor structure plane. Such angle is typically in the range $70 \leq \varphi \leq 110$.

In some embodiments, the tangential imaging setup 110 (and preferably also dark-field imaging setup), and one or more of the apex imaging setup 120, the edge top plane imaging setup 130 and the edge bottom plane imaging setup 140 are configured to define respective illumination paths propagating towards different contour regions arranged in a spaced-apart locations along the perimeter/circumference of the semiconductor structure. This can be achieved by positioning respective units of these imaging setups at different locations with respect to the structure's edge (circumference).

Each of the tangential imaging setup 110, the apex imaging setup 120, the edge top plane imaging setup 130 and the edge bottom plane imaging setup 140 may include a first and/or second back-light illumination unit and an imaging sensor unit. Each first and/or second back-light illumination unit may include a plurality of illumination elements e.g. a strip of LEDs.

At least one of the apex imaging sensor unit 124, edge top plane imaging sensor unit 134, or edge bottom plane imaging sensor unit 144 is configured and operable to collect reflected (visible) light from the contour region of the edge portion, respectively, to thereby obtain a reflective image being indicative of a profile of the edge.

The first illumination units (involved in bright field imaging mode) 122A, 132A, 142A are configured and operable to generate illumination directed to the contour region of edge portion. Each one of the first illumination units 122A, 132A, 142A define the illumination path that may be oriented substantially parallel to the optical axis of a respective imaging sensor unit, i.e., optical axis $O_2$ of the apex imaging sensor unit, optical axis $O_3$ of the edge top plane imaging sensor unit, and optical axis $O_4$ of the edge bottom plane imaging sensor unit.

Each of the second back-light illumination units 122B, 132B and 142B of the above-mentioned additional imaging setups 120, 130, 140 is configured and operable to generate respective back-light illumination to illuminate the contour outline of the contour region of the edge portion of the respective segment/slice of the semiconductor structure such that the respective imaging sensor unit 124, 134, 144 collects at least a part of the respective back-light illumination. Each of the second back-light illumination units 122B, 132B and 142B of the additional imaging setup 120, 130, 140 may be configured to define the illumination path being substantially parallel and overlapping with the detection path of the respective imaging sensor unit 124, 134, 144. This can be achieved by positioning the second back-light illumination unit in a substantially opposite side to the respective imaging sensor unit 124, 134, 144 with respect to the edge portion of the structure.

Table 1 below summarizes the three types of illuminations that can be used in the inspection system of the present disclosure in each imaging setup (IS) and the images obtained by using the different imaging setups alone or in combination.

TABLE 1

| Image | | Apex IS | Edge Top/ Bottom IS | Tangential IS |
|---|---|---|---|---|
| Bright field | Contour region | X | X | |
| Back light | Contour outline | X | X | X |
| Dark field | External/Internal defects | | | X |

As described above and exemplified with respect to FIGS. 3A-3B, 4A-4F, the tangential imaging setup 110 utilizes back light illumination enabling identification of the contour outline, and the dark-field imaging setup 115 utilizes dark field illumination (which may be constituted by the same back-light illumination) enabling to detect and locate external defects. As also described above, the apex setup 120 includes light source system 122 which may include first bright field illumination unit 122A and second back-light illumination unit 122B enabling to detect the respective contour region, its contour line and defects within said respective contour region. The edge top and bottom imaging setups include light source systems 132 and 142 which include respective bright field illumination units 132A and 142A and back-light illumination units 132B and 142B enabling to detect the respective contour region, its contour line and defects.

Typically, the edge and bevel inspection system 100 further includes a controller 150 configured and operable for synchronizing the imaging sessions (as well as orientation of the respective illumination and detection paths) of the tangential imaging setup 110 and of at least one additional imaging setup 115, 120, 130 or 140. Also, the controller can operate to enable different views of the same and different contour regions of the edge portion of the semiconductor structure (wafer) to be displayed side-by-side. The controller 150 may also be configured and operable for receiving and processing the images provided by the tangential imaging setup 110 and that/those of the at least one additional imaging setup 115, 120, 130 or 140. The images provided by the tangential imaging setup 110 and of the at least one additional imaging setup 115, 120, 130 or 140 are indicative of different views of the same edge portion formed by the zones within said edge portion (Zone 1-Zone 5). The controller 150 may also be configured and operable for creating a 3D model of the multi-tier wafer or creating a 3D model of the wafer's segment/slice.

In some embodiments, the controller 150 is configured in a cloud-based configuration and/or utilizes Internet-based computing so that parts of the processing circuitry and/or memory may reside in multiple distinct computer system (located at different geographic locations connectable via the communication network). The controller 150 may comprise a general-purpose computer processor, which is programmed in software to carry out the functions described herein below. It may be implemented by any hardware being capable of receiving, accumulating, processing, analyzing, and storing data. Unless specifically stated otherwise, as apparent from the following discussions, it is appreciated that throughout the present disclosure utilizing terms such as "determining", "processing" or the like, refer to the action and/or processes of a computer that manipulate and/or transform data into other data. Also, operations in accordance with the teachings herein may be performed by a computer specially constructed for the desired purposes, or by a general-purpose computer specially configured for the desired purpose by a computer program stored in a computer-readable storage medium. The computerized system may include one or more processors and may also include additional units or components such as memory units, communication units, and the like. It should thus be understood that the term "controller" should be interpreted broadly, covering local controllers (data analyzers) in data communication with the sensor unit/system, as well as cloud computing-based system. The functionality of the controller may be executed by any type of computer—one or more servers, one or more computers, may be operated in a centralized or distributed manner. The controller 150 may be located in the inspection system, or in a central location, or cloud based. In some embodiments, the control unit may also comprise a motion control module being configured and operable to control the position of the different elements in the system.

The controller 150 also includes the data input utility including a communication module for receiving images from the bonding region sensor and may also include the data output utility for relaying defect data and variations along the edge portion of the semiconductor structure being inspected. Memory (i.e., non-volatile computer-readable medium) may be configured for storing the input/output data, in a database. The database may be a cloud-based system. The processing circuitry is configured and operable to analyze at least part of the image data (e.g., images provided by two or more imaging setups) and/or determine contour outline data (edge profile data) to thereby identify different types of defect data and variations along the edge of the semiconductor structure.

All the parts of the processing circuitry or some of them may be parts/modules of independent stand-alone processors or may be integrated into the different modules of the same processor of one of the imaging setups.

In some embodiments, controller 150 is configured and operable to control the operation (start and end time and duration) of the imaging session performed by two or more of the imaging setups and the synchronization between them (simultaneously, sequentially (with a certain time gap between them), overlapping, etc.). Controller 150 may be configured and operable for synchronizing the operation of the tangential imaging setup 110 with at least one additional imaging setup 115, 120, 130 or 140.

Figure 7A:
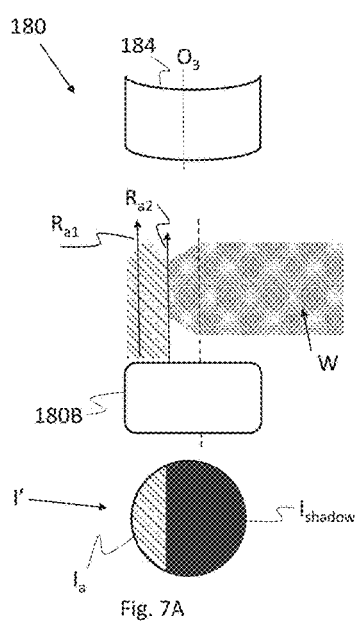
FIGS. 7A-7C show schematic cross-sectional views of possible configurations of the optical systems including the edge top plane imaging setup and the edge bottom plane imaging setup, wherein FIGS. 7B and 7C exemplify the edge top plane imaging setup and the edge bottom plane imaging setup according to some embodiments of the present disclosure and demonstrate advantageous features of the images obtainable by these configurations as compared to that of the configuration of FIG. 7A.
Figure 7B:
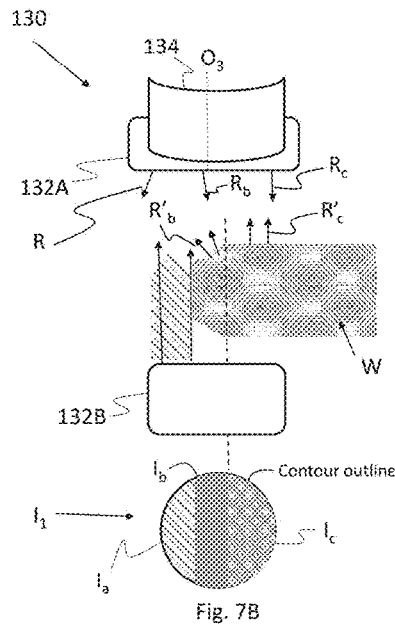
Figure 7C:
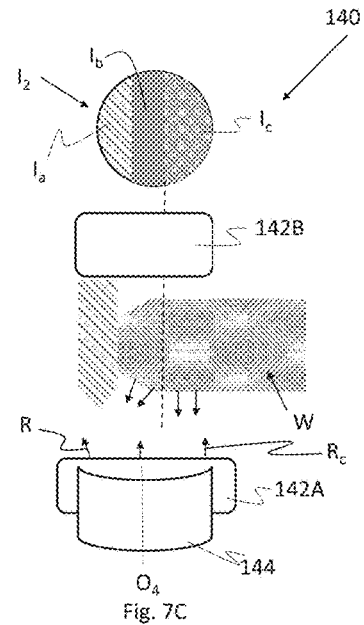

Reference is made to FIGS. 7A-7C exemplifying the abnormality/defect detection results of the technique of the present disclosure owing to the use of the tangential imaging system in combination with at least one of the above-described additional imaging setups.

FIG. 7A shows schematically the configuration and operation of an edge top plane imaging setup 180 utilizing a light source system having only a back light type edge top plane illumination unit 180B and an edge top plane imaging sensor unit 184. The illumination unit 180B (e.g., being placed below the wafer) defines a back-light illumination path (oriented substantially perpendicular to the flat surface of the edge portion) for directing the back-light illumination towards the contour outline of the contour region and towards the edge top plane imaging sensor unit 184. The imaging sensor unit 184 detects at least part of said back-light illumination.

Also shown in FIG. 7A is an image I' detected by the imaging sensor unit 184. The image I' has two image portions as follows: a portion $I_a$ corresponding to detection, by the imaging sensor unit 184, of rays $R_{a1}$ and $R_{a2}$ of the back-light illumination not intersecting/interacting with the contour region/contour outline (i.e., being thus indicative of free space propagation of the back-light illumination through an air gap region between the illumination and sensor units), and a black portion $I_{shadow}$ corresponding to detection, by the imaging sensor unit 184, of rays $R_{a2}$ of the back-light illumination resulting from intersection/interaction with the contour region/contour outline. As shown, the image portion $I_{shadow}$ results from the light blockage by the contour region and corresponds to a shadow image of the edge and bevel zones of the edge portion region being imaged. Specifically, the rays $R_{a2}$, illuminating a region very close to the apex region of the edge, provide a sharp image of the edge contour.

Reference is made to FIGS. 7B and 7C showing the imaging results provided by the edge top plane imaging setup 130 and the edge bottom plane imaging setup 140, respectively, according to the embodiments of the present disclosure, i.e., where each such imaging setup includes a combination of the back-light illumination and front illumination (at times referred to as bright field mode illumination).

FIG. 7B shows an edge top plane imaging setup 130 configured as described above, namely including an edge top plane illumination light source system and an edge top plane imaging sensor unit 134 being configured and operable to generate image data being indicative of a contour outline of the respective contour region of the edge portion of the semiconductor structure. The edge top plane light source system includes an illumination unit 132A configured and operable to generate front illumination R propagating along at least one bright-field illumination path $R_c$ towards a top-edge contour region of the edge of the semiconductor structure (e.g., wafer), and a back-light illumination unit 132B configured and operable to generate back-light top plane illumination propagating substantially perpendicularly with respect to the wafer plane and illuminating at least a part of the same region of the wafer being illuminated by the front light illumination unit 132A. The front illumination path defined by the illumination unit 132A is properly oriented with respect to the optical axis $O_3$ (detection path) of the imaging sensor unit 134 to provide collection/detection by said sensor unit 134 of rays $R'_b$ and $R'_c$ of the illumination reflected (specular reflection) from the wafer (e.g., the units 132A and 134 are both placed above the wafer). The back-light illumination unit 132B (e.g., is placed below the wafer) is configured and operable to define the back-light illumination path directing the back-light illumination towards the contour region of said edge portion and towards the imaging sensor unit 134 (the back-light illumination path is substantially parallel to and overlapping with the detection path of the sensor unit 134). The back-light illumination unit 132B may be positioned approximately opposite to the imaging sensor unit 134. The imaging session performed by the back-light illumination unit 132B and the imaging sensor unit 134 enables to identify the contour outline of the contour region being imaged.

As shown in the figure, the image $I_1$ detected by the imaging sensor unit 134 has three image portions $I_a$, $I_b$ and $I_c$. The dashed portion $I_a$ of image $I_1$ corresponds to collection by the imaging sensor unit 134 of the $R_{a1}$ and $R_{a2}$ of the back-light illumination not intersecting/interacting with the contour region/contour outline (i.e., being indicative of free-space propagation of the back-light illumination through an air gap between the units 132B and 134), keeping in mind that there is substantially no reflection of the back-light illumination from the contour region that can reach the sensor unit 134. The black portion $I_b$ of image I corresponds to collection by the imaging sensor unit 134 of rays $R_b$ of the back-light illumination unit 132B intersecting/interacting with the contour region/contour outline and being blocked by the wafer edges and of rays $R'^b$ of reflection of the front illumination $R_b$ (generated by the illumination unit 132A) from the top bevel zone (Zone 2 in FIG. 1A). The light-color image portion $I_c$ of image $I_1$ corresponds to collection by the imaging sensor unit 134 of rays $R'_c$ of reflection of the front illumination from the top flat surface of the edge portion (Zone 1 in FIG. 1A).

FIG. 7C shows an edge bottom plane imaging setup 140 configured as described above, namely including an edge bottom plane illumination light source system and an edge bottom plane imaging sensor unit 144. The edge bottom plane illumination light source system includes an illumination unit 142A configured and operable to generate front illumination R propagating along at least one bright-field illumination path $R_c$ towards a bottom-edge contour region of the edge portion of the semiconductor structure (e.g., wafer), and a back-light illumination unit 142B configured and operable to generate back-light illumination towards the same edge portion of the wafer being illuminated by the front illumination. The front illumination path is properly oriented with respect to the contour region of the edge portion and detection path of the sensor unit 144 to provide bright-field imaging mode by collection of reflection (specular reflection) of the front illumination generated by the unit 142A (e.g., the front illumination unit 142A and the imaging sensor 144 are both placed below the wafer). The back-light illumination unit 142B (e.g., being placed above the wafer), is configured and operable to direct back-light illumination along an illumination path towards the contour region (having contour outline corresponding to outer dimension/diameter of the wafer) and towards the edge bottom plane imaging sensor unit 144 (i.e., the back-light illumination path of unit 142B is substantially parallel to and overlapping with the detection path of the sensor unit 144). For example, the back-light illumination unit 142B is positioned approximately opposite to the imaging sensor unit 144. Imaging session performed by the back-light illumination unit 142B and sensor unit 144 enables to obtain image data indicative of the contour outline of the contour region.

As shown in the figure, the image $I_2$ obtained on the imaging sensor unit 144 has three image portions $I_a$, $I_b$ and $I_c$ as follows: Image portion $I_a$ corresponds to collection by the imaging sensor unit 144 of a part of the back-light illumination not interacting with the contour region (i.e., free space propagation of the back-light illumination through an air gap region between units 142B and 144), keeping in mind that there is practically no reflection of the back-light illumination from the contour region reached by the sensor unit. The image portion $I_b$ is indicative of a bottom bevel area (Zone 4 in FIG. 1), and image portion $I_c$ is indicative of the wafer bottom flat surface (Zone 5 in FIG. 1).

Reference is made to FIGS. 8A-8B showing a side view of the two exemplary optical systems including the imaging setups generally similar to those of FIGS. 7B-7C respectively, being capable of imaging (e.g., substantially simultaneously) contour regions of the edge portions of respective segments/slices of a semiconductor structure (e.g., wafer), which is a multi-tier structure in this specific not limiting example. The optical system 200 includes an edge top plane imaging setup 130 and an edge bottom plane imaging setup 140. Similarly to the configuration described above with respect to FIGS. 7B-7C, the edge top plane imaging setup 130 includes an edge top plane light source system including front and back-light illumination units 132A and 132B and an edge top plane imaging sensor unit 134, and is adapted to generate image data indicative of a contour region of the top edge portion of the structure; and the edge bottom plane imaging setup 140 includes an edge bottom plane light source system including front and back-light illumination units 142A and 142B and an edge bottom plane imaging sensor unit 144, and is adapted to generate image data indicative of a contour region of the bottom edge portion of the structure. In the non-limiting example of FIGS. 8A-8B, each of the front illumination units 132A and 142A (generating front top and front bottom illuminations) is configured and operable to define multiple illumination paths of different angular orientations with respect to the wafer edge portion (i.e., having different incidence angles). This is implemented by configuring each of such illumination units with multiple illumination elements arranged in a spaced-apart relationship along an arc-shaped path.

The front illumination path(s) FIPs defined by the illumination unit 132A is/are properly oriented with respect to the edge portion and with respect to the detection path (optical axis $O_3$) of the imaging sensor unit 134 (e.g., units 132A and 134 are both placed above the wafer), such that front illumination reflected from the top edge portion of the contour region is collected by the imaging sensor unit 134. Similarly, the front illumination path(s) FIP' defined by the illumination unit 142A is/are properly oriented with respect to the edge portion and with respect to the detection path DP' (optical axis $O_4$) of the imaging sensor unit 144 (e.g., units 142A and 144 are both placed above the wafer), such that front illumination reflected from the bottom edge portion of the wafer is collected by the imaging sensor unit 144.

Each of back-light illumination units 132B and 142B are configured and operable as described above with reference to FIGS. 7B and 7C (e.g., being placed, respectively, below and above the wafer) to generate and direct back-light illuminations towards the contour outlines of the respective contour regions and towards the edge top plane and edge bottom plane imaging sensor units 134 and 144.

Figure 9:
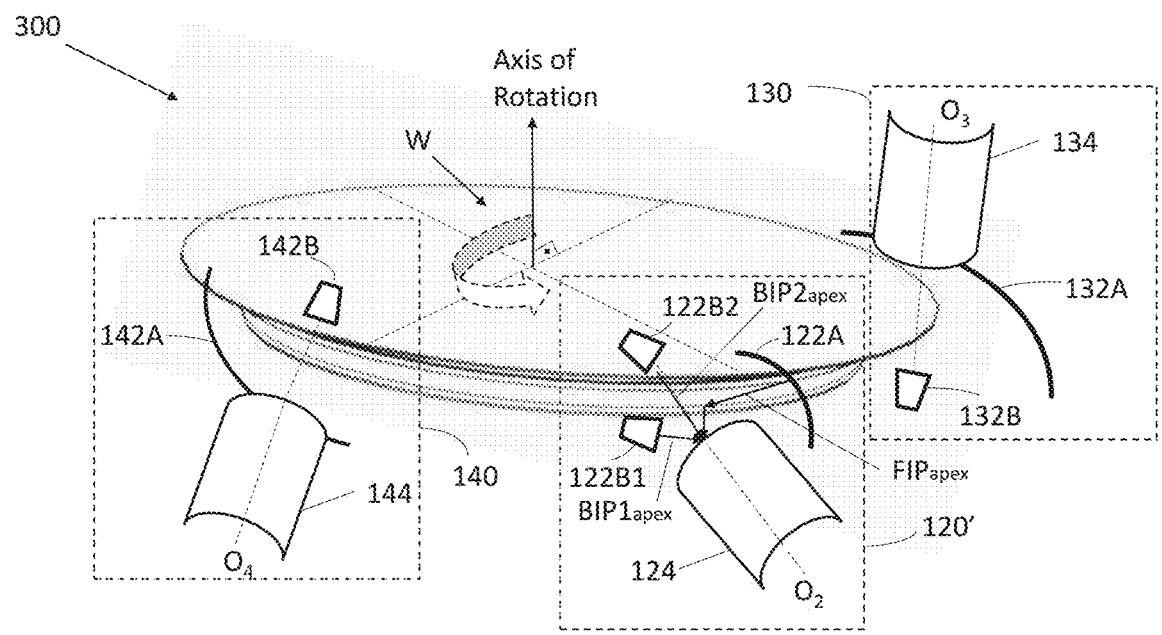
FIGS. 9 to 11 show three examples, respectively, of optical system including multiple optical assemblies capable of inspecting (concurrently) contour regions and contour outlines of different edge portions of a multi-tier stack, according to some embodiments of the present disclosure.

Reference is made to FIG. 9 exemplifying edge and bevel inspection utilizing an optical system 300 including a plurality (generally at least two) of imaging setups—three such imaging setups being exemplified in the figure, being capable of imaging (e.g., concurrently) of a plurality of spaced-apart contour regions of the edge portions of respective segments/slices along the edge of a semiconductor structure (e.g., wafer). In this example, the optical system 300 includes an apex imaging setup 120', an edge top plane imaging setup 130 and an edge bottom plane imaging setup 140. The multiple imaging setups (e.g., the apex imaging setup 120', the edge top plane imaging setup 130 and the edge bottom plane imaging setup 140) may be operable simultaneously during the wafer rotation, e.g., to generate images of contour region of different segments/slices of the multi-tier stack at the same time. The direction of the wafer rotation is marked in the figure.

Similarly to the configuration described above with respect to FIGS. 7B, the edge top plane imaging setup 130 includes an edge top plane illumination light source system and an edge top plane imaging sensor unit 134. The functionality of the elements of the edge top plane imaging setup 130 and the edge bottom plane imaging setup 140 of FIG. 9 is similar to that described above with reference to FIGS. 8A-8B, although the respective positions of each imaging setup is changed. The apex illumination setup 120' includes a first illumination unit 122A adapted to generate front illumination propagating along front illumination path $FIP_{apex}$ to illuminate the contour region of the edge portion (e.g., using multiple illumination beams propagation along illumination paths of different angular orientations as described above), and second bottom and top back-light illumination units $122B_1$ (below the wafer) and $122B_2$ (above the wafer), both being configured to direct respective back-light illuminations along back-light illumination paths $BIP1_{apex}$ and $BIP2_{apex}$ to the same contour region being illuminated by the front illumination generated by unit 122A.

For example, although not seen in the figure, the front light illumination path $FIP_{apex}$ of unit 122A is oriented approximately parallel to the optical axis $O_2$ of the imaging sensor (i.e., so-called normal imaging mode), such that the front illumination from the contour region is reflected towards the imaging sensor 124. In some embodiments, the back-light illumination units 122B1 and 122B2 (e.g., being placed below and above the wafer respectively) are configured and operable to define illumination paths $BIP1_{apex}$ and $BIP2_{apex}$ towards bottom and top surfaces of the edge portion of the wafer to illuminate the respective contour regions to be imaged by the apex imaging sensor unit 124. The use of back-light illumination units 122B1 and 122B2 thus enables to identify the contour outline of the contour region from below and above. The presence of the back-light illumination units in the apex imaging setup 120' enables to inspect the edge and bevel aspect of the wafer and to reveal the contour outline of the respective segment/slice of the wafer (stack), and to detect defects that are external to the contour outline, as well as defects that are not always visible from other angles. In some embodiment, only one back-light illumination unit 122B can be used in the apex imaging setup. Such back-light illumination unit 122B defines back-light illumination path directing back-light illumination towards either bottom or top of the wafer similar to that of illumination units $122B_1$ and $122B_2$, respectively.

Figure 10:
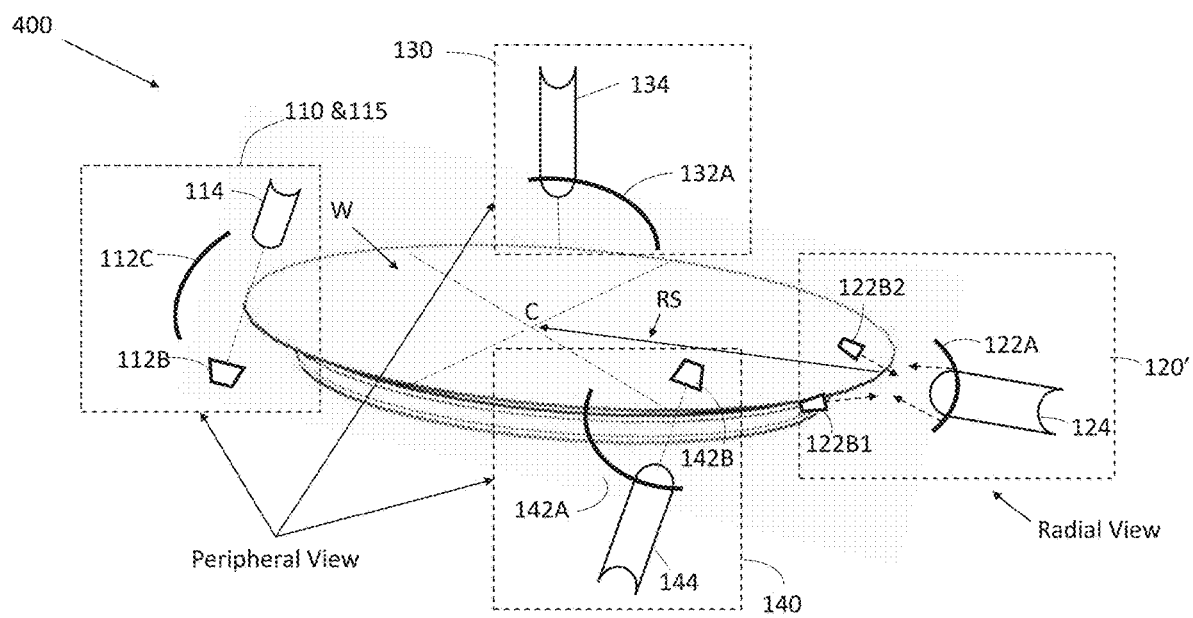

Reference is made to FIG. 10 showing schematically an optical system 400 according to some embodiments of the present disclosure. The system 400, similar to the above-described system 300, includes a plurality (generally at least two) of imaging setups capable of imaging (e.g., concurrently) of a plurality of spaced-apart contour regions along the edge of a semiconductor structure (e.g., wafer).

The optical system 400 includes an optical assembly including a tangential imaging setup 110 and a dark-field imaging setup 115 both configured and operable for imaging the same contour region, an apex imaging setup 120', an edge top plane imaging setup 130 and an edge bottom plane imaging setup 140. The tangential and dark imaging setups 110, 115, the edge top plane imaging setup 130 and the edge bottom plane imaging setup 140 are configured to perform imaging sessions (image acquisitions) of contour regions along the edge/periphery of the wafer, from the tangent, top and bottom positions, respectively. In this specific and non-limiting example, the tangential imaging setup 110 (together with the dark-field imaging setup 115) and the apex imaging setup 120' are associated with different contour regions of the wafer (e.g., are placed in different positions with respect to the wafer). Although the figure shows that the tangential imaging setup 110 is placed in an opposite position on the wafer with respect to the apex imaging setup 120', the configuration of the system 400 is not limited to this configuration. The apex imaging setup 120' is positioned substantially facing the center of the wafer C, along a wafer radial line RS, and is configured to capture the radial view images.

It should be noted with regards to peripheral view setups (i.e. the imaging setups 110, 130 and 140) that if the depth of field is increased, the same edge portion of the wafer is observed. Regarding the radial view setup (i.e., the apex imaging setup 120'), if the depth of field is increased, a larger portion of the wafer is observed. At least two of the imaging setups exemplified in the figure, are configured to operate simultaneously during the wafer rotation and to generate images of different contour regions of the structure (e.g., different slices of the multi-tier structure) at the same time.

For example, if the tangential imaging setup 110 is used together (e.g., concurrently) with the apex imaging setup 120', the sensing data, such as metrology data, acquired from multiple angles include additional metrology information, which cannot be obtained with one single imaging setup. In this specific and non-limiting example, the metrology data may include at least one of the actual profile of the structure from the side, the shape of the structure being imaged at a particular height, the height/thickness of structure, the height/thickness of each tier in a multi-tier structure, the profile of the edge and bevels, the curve angles, the surface, the bevel, or the roundness.

For example, in some instances, if the edge top plane imaging setup 130 is used together (concurrently) with the edge bottom plane imaging setup 140, the lateral dimension (e.g., diameter) of the structure can be extracted from the image data more accurately than is obtainable from image data of the single imaging setup.

For example, if the apex imaging setup 120' is used together (concurrently) with the edge top plane imaging setup 130 or the edge bottom plane imaging setup 140, the abnormalities/defect related data, such as chipping, may include additional information, metrology information.

In the example of FIG. 10, similarly to the examples described above with respect to FIGS. 3B, 4A, 4B, the tangential and dark-field imaging setups 110 and 115 include a back-light illumination unit 112B, a dark-field illumination unit 112C, and a common tangential imaging sensor unit 114 configured and operable to generate image data indicative of a contour outline of the structure (multi-tier stack in this example) superposed with detected scattering from the same contour region, e.g., indicative of external defects protruding from the wafer surface. The back-light illumination unit 112B is thus positioned approximately opposite to the imaging sensor 114, illuminating the contour outline (i.e. defined by wafer stack top plane and wafer stack bottom wafer) and directed at the imaging sensor 114. The functionality of the elements of the apex imaging setup 120', the edge top plane imaging setup 130 and the edge bottom plane imaging setup 140 shown in FIG. 10 is similar to those of the above described of FIG. 9, although the respective positions of each imaging setup is different.

Figure 11:
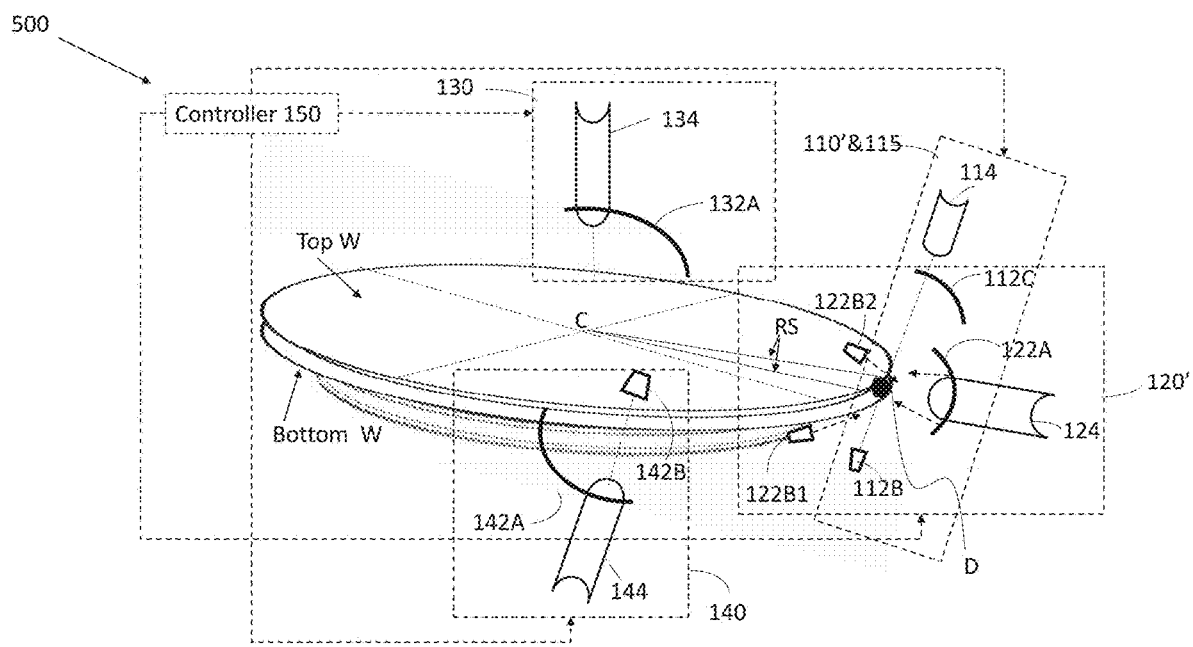

Reference is made to FIG. 11 exemplifying an optical system 500 according to yet another possible configuration of the technique of the present disclosure. The optical system 500 includes four imaging setups, enabling concurrent detection of a defect D and inspection of a contour outline of the structure being imaged (e.g., a multi-tier structure). The system 500 includes tangential and dark-field imaging setups 110' and 115, an apex imaging setup 120', an edge top plane imaging setup 130 and an edge bottom plane imaging setup 140 which are configured generally similar to those of the example of FIG. 10 described above. In the specific and non-limiting example of FIG. 11, the tangential imaging setup 110' is configured and operable to generate image data indicative of the contour outline of the same contour region as the apex imaging setup 120'. The tangential imaging setup 110' includes a back-light illumination unit 112B, a dark field illumination unit 112C, and a tangential imaging sensor unit 114 configured and operable to generate image data indicative of a defect D and a contour outline of the respective edge portion (e.g., multi-tier stack). In this specific and non-limiting example, the dark field imaging setup and the apex imaging setup utilizes the common illumination unit 122A (e.g., defining multiple illumination paths of different angular orientations). The functionality of the elements of the apex imaging setup 120', the edge top plane imaging setup 130 and the edge bottom plane imaging setup 140 of FIG. 11 is similar to that of the example described with reference to FIG. 10, although the position of the tangential imaging setup is changed.

Optionally, one or more of the illumination units, i.e., illumination units 122A, 122$B_1$, 122$B_2$ of the apex imaging setup, the back-light illumination unit 112B of the tangential imaging setup, the dark field illumination unit 112C, the illumination units 132A, 132B (132B being located under the wafer and therefore cannot be seen in the figure) of the edge top plane imaging setup 130, the illumination units 142A, 142B of the edge bottom plane imaging setup 140, are configured and operable to generate collimated or near-collimated illumination. The one or more of these illumination units may include a collimated light source, with near zero divergence emitting a beam of light where all rays are substantially parallel; and/or may include a fluorescence excitation light source in which case at least one of the imaging sensor units 114, 124, 134 and 144 may comprise a fluorescence detector.

As described above, the inspection system of the present disclosure is capable of obtaining images being indicative of the same defect(s) acquired from different angles, providing additional information related to defect data. As described above, the technique of the present disclosure enables viewing the edge and bevel aspect of the semiconductor structure, using multiple imaging setups, positioned at different angles, to reveal defects that can only be detected at specific angles (i.e., defects that might not be visible from some angles). Moreover, the technique of the present disclosure enables viewing the edge and bevel aspect of the semiconductor structure, using multiple imaging setups, positioned at different angles, to provide additional information needed for inspection and metrology of defects (as compared to the information available by a single imaging setup).

Figure 12:
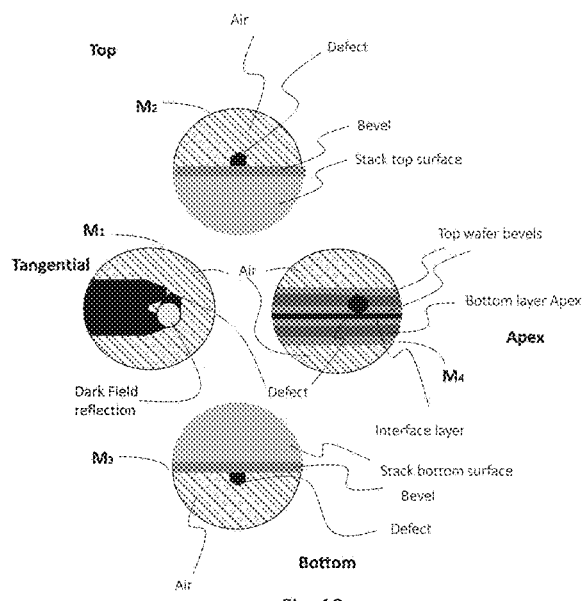
FIG. 12 shows different possible images of a multi-tier stack, having an external defect in the edge and bevel region, captured by using the teachings of the present disclosure.

Reference is made to FIG. 12 showing a plurality of possible images $M_1$-$M_4$ of a multi-tier stack obtained by combination of different imaging setups described above, providing additional information on a potential defect and/or the contour region being bounded by the contour outline. As described above, the system of the present disclosure is capable of providing simultaneous inspection of the edge and bevels of multiple tiers in a multi-tier stack.

In particular, image $M_1$ can be obtained by using the tangential imaging setup and the dark-field imaging setup (configured as described above) performing imaging sessions on the same contour region. Image $M_1$ has three different regions: dashed region (air region) corresponding to detection of tangential illumination that did not interact with the contour region, a bright spot corresponding to the defect (imaged by detection of dark field scattering) protruding from the surface, and a black region corresponding to the image of the contour region being bounded by the contour outline also showing the external defect.

Image $M_2$ is representative of an image that can be obtained by using the edge top plane imaging setup. Image $M_2$ has a dashed region (air region), a black region/spot corresponding to the external defect protruding from the surface, a gray-color region corresponding to the bevel and the multi-tier stack top surface showing clearly the interface region between the bevel and the top flat zone.

Image $M_3$ is representative of an image that can be obtained by using the edge bottom plane imaging setup. Image $M_3$ shows the dashed region (air region), a black region/spot corresponding to the external defect protruding from the surface, the bevel and the multi-tier stack bottom surface showing clearly the interface region between the bevel and the bottom flat zone.

Image $M_4$ is representative of an image that can be obtained by using the apex imaging setup. Image $M_4$ shows the dashed region (air region), the black spot corresponding to the external defect protruding from the surface, the top wafer bevels, the bonding interface, and the bottom wafer bevels.

Figure 13:
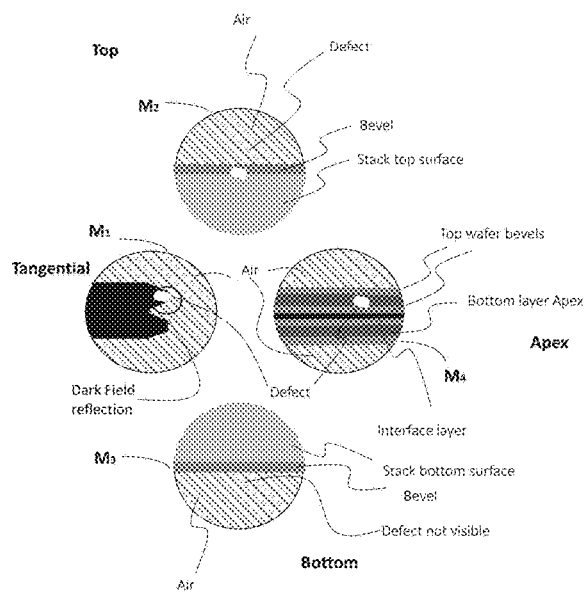
FIG. 13 shows different possible images of a multi-tier stack, having an internal defect in the edge and bevel region, captured by using the teachings of the present disclosure.

Reference is made to FIG. 13 exemplifying a plurality of images $M_1$-$M_4$ of a multi-tier stack being obtained by the different imaging setups described above and their combinations, providing additional information on an internal defect, e.g., a notch (indentation), void or crack in the top bevel region being bounded by the contour outline. As described above, the system of the present disclosure is capable of providing a simultaneous inspection of the edge and bevels of multiple tiers in a multi-tier stack.

In particular, image $M_1$ is representative of an image that can be obtained by using the tangential imaging setup and the dark imaging setups configured as described above. Image $M_1$ shows three different regions: the dashed region (air region), the dark field scattering region being indicative of an internal defect in the top wafer bevel zone, and the contour region being bounded by the contour outline also showing the internal defect.

Image $M_2$ is representative of an image that can be obtained by using the edge top plane imaging setup. Image $M_2$ shows the air region, the bevel and the internal defect in the surface of the top wafer bevel zone, and the multi-tier stack top surface, providing high-contrast information about the interface region between the bevel and the top flat zone.

Image $M_3$ is representative of an image that can be obtained by using the edge bottom plane imaging setup. Image $M_3$ shows the air region, the bottom bevel, the multi-tier stack bottom surface and a sharp transition region between the bottom bevel and the multi-tier stack bottom surface, clearly indicating that the internal defect exists only on the top wafer bevel.

Image $M_4$ is representative of an image that can be obtained by using the apex imaging setup. Image $M_4$ shows the air region, top wafer bevels and the internal defect in the surface of the top wafer bevel zone, the bonding interface, and the bottom wafer bevels.

Thus, the edge and bevel inspection technique of the present disclosure, utilizing the tangential imaging setup and at least one additional imaging set up (preferably including the dark-field imaging setup) provides effective inspection of the edge portion of a semiconductor structure (single- or multi-tier structure) to identify and locate abnormalities of the edge profile, as well as determination of dimensions of such abnormalities.

The invention claimed is:

1. An inspection system for edge and bevel inspection of a semiconductor structure, the inspection system comprising:

an optical system configured to define a tangential imaging setup and a dark-field imaging setup, the tangential imaging setup comprising a tangential illumination unit configured and operable to provide back-light tangential illumination propagating along a tangential illumination path with respect to a contour outline of a contour region of an edge of the semiconductor structure along an optical axis substantially parallel with respect to bottom and top layers of the semiconductor structure and substantially along a detection path of a tangential imaging sensor unit, and the dark-field imaging setup comprising a dark-field illumination unit configured for directing dark-field illumination towards the contour region along at least one dark-field illumination path being inclined with respect to said tangential illumination path, the dark-field imaging setup providing collection of scattering of a response of the contour region to the dark-field illumination, thereby enabling detection of a dark-field image indicative of location of defects along said profile of the edge of the semiconductor structure;

wherein the tangential imaging sensor unit is configured to collect at least a part of said back-light tangential illumination propagating along said tangential illumination path and generates image data indicative of a tangential image of a contour outline of the contour region of the edge of the semiconductor structure thereby enabling detection of defect data of a profile of the edge of the semiconductor structure, and is configured to collect said scattering of the response of the contour region to the dark-field illumination, thereby enabling to obtain image data comprising the tangential image of the contour outline with superposition of the dark field image of said contour region.

2. The system according to claim 1, wherein said dark-field imaging setup comprises at least one dark-field imaging sensor unit defining a dark-field detection path for detecting the scattering of the response of the contour region to said dark-field illumination, thereby obtaining the dark-field image.

3. The system according to claim 1, wherein said dark-field illumination unit is configured to define multiple dark-field illumination paths of different incidence angles on the contour region.

4. The system according to claim 3, wherein the dark-field imaging setup comprises at least one dark-field imaging sensor unit defining at least one dark-field detection path for detecting the scattering of the response of the contour region to said dark-field illumination, thereby obtaining the dark-field image.

5. The system according to claim 1, wherein said tangential illumination path is substantially perpendicular to an axis of rotation of the wafer.

6. The system according to claim 1, wherein said tangential imaging sensor unit is configured and operable to be focused on the contour outline of the contour region of the edge.

7. The system according to claim 1, wherein said tangential illumination unit is configured and operable to generate said back-light tangential illumination of a visible or near visible spectral range.

8. The system according to claim 1, wherein said tangential illumination unit comprises at least one LED.

9. The system according to claim 1, further comprising one or more additional imaging setups thereby providing image data indicative of additional information related to the edge of the semiconductor structure, said one or more additional imaging setup comprising at least one of the following:
- (a) an apex imaging setup configured and operable to generate image data being indicative of an apex contour region of the edge of the semiconductor structure indicative of a layout of top-bevel zone, apex zone and bottom-bevel zone of the edge and of a bonding interface volume of the semiconductor structure;
- (b) an edge top plane imaging setup configured and operable to generate an image of a contour region of the edge of the semiconductor structure indicative of a layout of top near-edge zone, top bevel zone and apex zone of the edge of the semiconductor structure; and
- (c) an edge bottom plane imaging setup configured and operable to generate an image of a contour region of the edge of the semiconductor structure indicative of a layout of bottom near-edge zone, bottom bevel zone and apex zone of the edge of the semiconductor structure.

10. The system according to claim 9, wherein each of said one or more additional imaging setups is configured to define at least one additional illumination path and an associated additional detection path for imaging at least one additional contour region of the edge of the semiconductor structure at a location spaced-apart from said contour region being imaged by the tangential and dark-field imaging setups, thereby enabling substantially simultaneous imaging of different contour regions of the edge of the semiconductor structure, and enabling imaging of multiple edge portions of the semiconductor structure along a circumference thereof during rotation of the semiconductor structure; the system further comprising a control unit configured and operable for synchronizing performance of image acquisition sessions by the imaging setups.

11. The system according to claim 9,
wherein the apex imaging setup comprises at least one illumination unit and an apex imaging sensor unit, wherein:
said at least one illumination unit is configured and operable to provide at least one of bright-field illumination and back-light apex illumination, the bright-field illumination propagating towards the apex contour region of the edge of the semiconductor structure along a bright-field illumination path, and the back-light apex illumination propagating towards the apex contour region along at least one of back-light apex illumination paths being inclined with respect to a rotation axis of the semiconductor structure and forming grazing angles with, respectively, at least one of top and bottom surface regions of the edge;
the apex imaging sensor unit is adapted for collecting at least a part of said back-light apex illumination and reflection of said bright-field illumination from the apex region of the edge.

12. The system according to claim 11, wherein said back-light apex illumination is propagating towards the apex contour region along first and second apex illumination paths each being inclined with respect to a rotation axis of the semiconductor structure and forming a grazing angle with the top and bottom surface regions of the edge, respectively.

13. The system according to claim 9, wherein the edge top plane imaging setup comprises: an edge top plane illumination light source system comprising at least first and second illumination units, and an edge top plane imaging sensor unit; the first illumination unit being configured and operable to generate bright-field illumination propagating along at least one bright-field illumination path towards a top edge contour region of the edge, and the second illumination unit being configured to generate back-light top plane illumination propagating along a top plane illumination path along an axis forming an angle θ with a semiconductor structure plane, such that 70≤θ≤110 and substantially along a detection path of the edge top plane imaging sensor unit, which detects at least a part of said back-light top plane illumination propagating along said top plane illumination path and reflection of said bright-field illumination from said top-edge contour region, and generates said image of the contour region of the edge indicative of the contour outline, and layout of top near-edge zone, top bevel zone and apex zone of the edge.

14. The system according to claim 9,
wherein the edge bottom plane imaging setup comprises:
an edge bottom plane illumination light source system comprising at least first and second illumination units, and an edge bottom plane imaging sensor unit; the first illumination unit being configured and operable to generate bright-field illumination propagating along at least one bright-field illumination path towards a bottom edge contour region of the edge, and the second illumination unit being configured to generate back-light bottom plane illumination propagating along a bottom plane illumination path along an axis forming an angle j with a semiconductor structure plane, such that 70≤φ≤110 and substantially along a detection path of the edge bottom plane imaging sensor unit, which detects at least a part of said back-light bottom plane illumination propagating along said bottom plane illumination path and reflection of said bright-field illumination from said bottom-edge contour region, and generates said image of the contour region of the edge indicative of the contour outline, and layout of bottom near-edge zone, bottom bevel zone and apex zone of the edge.

15. An inspection system for edge and bevel inspection of a semiconductor structure, the inspection system comprising:
an optical system configured to define a tangential imaging setup and a dark-field imaging setup,
the tangential imaging setup comprising a tangential illumination unit configured and operable to provide back-light tangential illumination propagating along a tangential illumination path with respect to a contour outline of a contour region of an edge of the semiconductor structure and substantially along a detection path of a tangential imaging sensor unit, which detects at least a part of said back-light tangential illumination propagating along said tangential illumination path and generates image data indicative of a tangential image of a contour outline of the contour region of the edge of the semiconductor structure thereby enabling detection of defect data of a profile of the edge of the semiconductor structure, and
the dark-field imaging setup comprising a dark-field illumination unit configured for directing dark-field illumination towards the contour region along at least one dark-field illumination path being inclined with respect to said tangential illumination path, the dark-field imaging setup providing collection of scattering of a response of the contour region to the dark-field illumination, thereby enabling detection of a dark-field image indicative of location of defects along said profile of the edge of the semiconductor structure;

wherein said tangential imaging sensor unit is configured to collect said at least part of the tangential illumination propagating along said tangential illumination path and collecting said scattering of the response of the contour region to the dark-field illumination, thereby enabling to obtain image data comprising the tangential image of the contour outline with superposition of the dark field image of said contour region, and wherein said dark-field imaging setup comprises at least one dark-field imaging sensor unit defining at least one dark-field detection path for detecting the scattering of the response of the contour region to said dark-field illumination, thereby obtaining the dark-field image.

16. The system according to claim 15, wherein said dark-field illumination unit is configured to define multiple dark-field illumination paths of different incidence angles on the contour region.

17. The system according to claim 16, wherein said multiple dark-field illumination paths have angular orientations with respect to the contour region being imaged and with respect to said tangential illumination path and said dark-field detection path such that each of the tangential imaging sensor unit and the dark-field sensor unit is adapted to detect reflection and scattering of illumination from the contour region.

18. An inspection system for edge and bevel inspection of a semiconductor structure, the inspection system comprising:

an optical system configured to define a tangential imaging setup and a dark-field imaging setup, the tangential imaging setup comprising a tangential illumination unit configured and operable to provide back-light tangential illumination propagating along a tangential illumination path with respect to a contour outline of a contour region of an edge of the semiconductor structure and substantially along a detection path of a tangential imaging sensor unit, which detects at least a part of said back-light tangential illumination propagating along said tangential illumination path and generates image data indicative of a tangential image of a contour outline of the contour region of the edge of the semiconductor structure thereby enabling detection of defect data of a profile of the edge of the semiconductor structure, and the dark-field imaging setup comprising a dark-field illumination unit configured for directing dark-field illumination towards the contour region along at least one dark-field illumination path being inclined with respect to said tangential illumination path, the dark-field imaging setup providing collection of scattering of a response of the contour region to the dark-field illumination, thereby enabling detection of a dark-field image indicative of location of defects along said profile of the edge of the semiconductor structure; and one or more additional imaging setups thereby providing image data indicative of additional information related to the edge of the semiconductor structure, said one or more additional imaging setup comprising at least one of the following:

(a) an apex imaging setup configured and operable to generate image data being indicative of an apex contour region of the edge of the semiconductor structure indicative of a layout of top-bevel zone, apex zone and bottom-bevel zone of the edge and of a bonding interface volume of the semiconductor structure;

(b) an edge top plane imaging setup configured and operable to generate an image of a contour region of the edge of the semiconductor structure indicative of a layout of top near-edge zone, top bevel zone and apex zone of the edge of the semiconductor structure; and (c) an edge bottom plane imaging setup configured and operable to generate an image of a contour region of the edge of the semiconductor structure indicative of a layout of bottom near-edge zone, bottom bevel zone and apex zone of the edge of the semiconductor structure;

wherein each of said one or more additional imaging setups is configured to define at least one additional illumination path and an associated additional detection path for imaging at least one additional contour region of the edge of the semiconductor structure at a location spaced-apart from said contour region being imaged by the tangential and dark-field imaging setups, thereby enabling substantially simultaneous imaging of different contour regions of the edge of the semiconductor structure, and enabling imaging of multiple edge portions of the semiconductor structure along a circumference thereof during rotation of the semiconductor structure; the system further comprising a control unit configured and operable for synchronizing performance of image acquisition sessions by the imaging setups.

19. The system according to claim 18, wherein said tangential imaging sensor unit is configured to collect said at least part of the tangential illumination propagating along said tangential illumination path and collecting said scattering of the response of the contour region to the dark-field illumination, thereby enabling to obtain image data comprising the tangential image of the contour outline with superposition of the dark field image of said contour region.

* * * * *